United States Patent
Yang et al.

(10) Patent No.: US 12,261,272 B2
(45) Date of Patent: Mar. 25, 2025

(54) BATTERY SYSTEM

(71) Applicant: LG ENERGY SOLUTION, LTD., Seoul (KR)

(72) Inventors: Mun-Seok Yang, Daejeon (KR); Yo-Hwan Kim, Daejeon (KR); Ji-Hun Kim, Daejeon (KR); Hong-Jae Park, Daejeon (KR); Sung-Han Yoon, Daejeon (KR); Ji-Won Lee, Daejeon (KR); Hyun-Min Lee, Daejeon (KR); Hyung-Uk Lee, Daejeon (KR); Seung-Jun Lee, Daejeon (KR); Tae-Shin Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/754,330

(22) Filed: Jun. 26, 2024

(65) Prior Publication Data

US 2024/0347791 A1 Oct. 17, 2024

Related U.S. Application Data

(63) Continuation of application No. PCT/KR2023/000983, filed on Jan. 19, 2023.

(30) Foreign Application Priority Data

Jan. 19, 2022 (KR) ........................ 10-2022-0008059

(51) Int. Cl.
*H01M 10/42* (2006.01)
*A62C 3/16* (2006.01)
(Continued)

(52) U.S. Cl.
CPC ............. *H01M 10/425* (2013.01); *A62C 3/16* (2013.01); *H01M 10/613* (2015.04);
(Continued)

(58) Field of Classification Search
CPC ............. H01M 10/627; H01M 50/251; H01M 50/204; A62C 3/16
See application file for complete search history.

(56) References Cited

U.S. PATENT DOCUMENTS

| 9,812,865 B2 | 11/2017 | Treppmann et al. |
| 2012/0176080 A1 | 7/2012 | Uchihashi et al. |

(Continued)

FOREIGN PATENT DOCUMENTS

| JP | 5715135 B2 | 5/2015 |
| JP | 2018-26255 A | 2/2018 |

(Continued)

OTHER PUBLICATIONS

International Search Report (PCT/ISA/210) issued in PCT/KR2023/000983, dated May 16, 2023.

*Primary Examiner* — Maria Laios
*Assistant Examiner* — Jordan E Berresford
(74) *Attorney, Agent, or Firm* — Birch, Stewart, Kolasch & Birch, LLP

(57) ABSTRACT

A battery system includes a plurality of battery containers, each including a battery rack, a container housing accommodating the battery rack in an internal space, and a first power line configured to transmit charge power and discharge power, wherein the first power lines of the battery containers are connected to each other, and a control cabinet including a control module configured to control the plurality of battery containers, a cabinet housing accommodating the control module in an internal space, and a second power line configured to be connected to the first power line of one of the plurality of battery containers.

19 Claims, 25 Drawing Sheets

(51) Int. Cl.
H01M 10/613 (2014.01)
H01M 10/627 (2014.01)
H01M 10/6568 (2014.01)
H01M 50/204 (2021.01)
H01M 50/251 (2021.01)
H01M 50/298 (2021.01)
H01M 50/502 (2021.01)
H02J 3/32 (2006.01)

(52) U.S. Cl.
CPC ..... H01M 10/627 (2015.04); H01M 10/6568 (2015.04); H01M 50/204 (2021.01); H01M 50/251 (2021.01); H01M 50/298 (2021.01); H01M 50/502 (2021.01); *H01M 2200/10* (2013.01); *H01M 2220/10* (2013.01); H02J 3/32 (2013.01)

(56) References Cited

U.S. PATENT DOCUMENTS

| | | | |
|---|---|---|---|
| 2015/0318522 | A1 | 11/2015 | Kim et al. |
| 2019/0181406 | A1* | 6/2019 | Sugeno ............... H01M 50/298 |

FOREIGN PATENT DOCUMENTS

| | | |
|---|---|---|
| KR | 10-2013-0105472 A | 4/2013 |
| KR | 10-2014-0070981 A | 6/2014 |
| KR | 10-2015-0064962 A | 6/2015 |
| KR | 10-2037142 B1 | 10/2019 |
| KR | 10-2098946 B1 | 4/2020 |
| KR | 10-2101011 B1 | 4/2020 |
| KR | 10-2338516 B1 | 12/2021 |

* cited by examiner

BATTERY SYSTEM

The present application is a Continuation of PCT/KR2023/000983, filed Jan. 19, 2023, which claims the benefit of Korean Patent Application No. 10-2022-0008059 filed on Jan. 19, 2022, with the Korean Intellectual Property Office, the disclosures of which are incorporated herein by reference in their entireties.

TECHNICAL FIELD

The present disclosure relates to a battery, and more particularly, to a battery system including a plurality of battery containers connected to each other.

BACKGROUND

In recent times, a surge in energy-related challenges, including power shortages and the growing emphasis on eco-friendly energy solutions, has placed the spotlight on energy storage systems (ESS). Notably, ESS has emerged as a pivotal solution for storing generated power.

For instance, the concept of a smart grid system has been proposed for effectively managing power supply and demand, recognizing that consumer electricity consumption is often variable and subject to fluctuations. The strategic integration of an ESS facilitates the establishment of power management systems, such as smart grid systems, which can adeptly regulate power supply and demand in specific regions or urban areas. In addition, the proliferation of electric vehicles (EVs) in the commercial landscape has created an opportunity to implement ESS in electric charging stations designed for EVs.

ESS configurations can take various forms, but they typically include at least one battery container. The battery container is usually a housing designed to accommodate components and is reminiscent of larger shipping containers, which are transportable by both land and sea. These battery containers often bear substantial dimensions, akin to the standard 20-foot or 40-foot shipping containers described above. The term "container" serves to underscore the significant size of the battery container used in ESS applications.

Within the battery container, a number of batteries can be connected in series and/or parallel to each other. These batteries can be stacked, using, for example, rack frames or distinct fixed structures, forming a battery rack. Each battery container typically houses at least one battery rack.

In the context of ESS used in smart grid systems and similar applications, multiple battery containers can be connected to each other to increase charge and discharge capacity. Nonetheless, these large battery containers present challenges related to transportation and installation. Their substantial size and weight can make post-positioning mobility of the battery container extremely cumbersome. As a result, the connection of a plurality of battery containers in the field necessitates meticulous process design and a high degree of skill on the part of workers, often extending the installation timeline of such battery containers.

Furthermore, conventional battery containers are often not easily amenable to additional connections. Once a plurality of containers have been connected together for ESS deployment, connecting additional new battery containers becomes a daunting task, further hindering the adjustment and expansion of the ESS value chain. To illustrate, when installing a pre-existing ESS, direct DC-connection of a battery container to a Power Conversion/Conditioning System (PCS) often requires extensive groundwork, particularly if the distance between the battery container and the PCS is substantial, necessitating lengthy DC lines. Consequently, the installation process can become even more intricate, time-consuming, and financially burdensome.

Furthermore, the need for an ideal battery container extends beyond mere workability and expandability; it encompasses a demand for a diverse range of features, including high energy density and robust first-safety capabilities.

DISCLOSURE

Technical Problem

The present disclosure is designed to solve the above problems, and therefore the present disclosure is directed to providing a battery system that is easy to install or expand and has improved safety, and an energy storage system comprising the same.

However, the technical problem to be solved by the present disclosure is not limited to the above-described problem, and these and other problems will be clearly understood by those skilled in the art from the detailed description below.

Technical Solution

To achieve the above-described objective, a battery system according to an aspect of the present disclosure includes a plurality of battery containers, each battery container including a battery rack, a container housing accommodating the battery rack in an internal space, and a first power line configured to transmit charge power and discharge power, wherein the first power lines of the battery containers are connected to each other; a control cabinet including a control module configured to control the plurality of battery containers, a cabinet housing accommodating the control module in an internal space, and a second power line configured to be connected to the first power line of a first battery container of the plurality of battery containers, wherein the control cabinet is spaced from the plurality of battery containers and a third power line extending from the first power line of the first battery container to the first power line of a second battery container of the plurality of battery containers, wherein each of the plurality of battery containers has a recess in a side of the container housing, wherein an end of the first power line extends into the recess, wherein each of the plurality of battery containers has a cover covering the recess, the cover hingedly connected to the container housing, wherein the cover of one of a pair of battery containers of the plurality of battery containers is hingedly connected along a top edge of the cover, wherein the cover has a first position covering the recess and a second position with a bottom edge of the cover contacting an other of the pair of battery containers, wherein a wing portion is attached to each side edge of the cover, wherein the cover has a first mounting member, a second mounting member and a cover member extending between the first mounting member and the second mounting member, the cover member forming an enclosure, wherein each of the plurality of battery containers has a main pipe, wherein the firefighting cabinet is connected to the main pipe of the first battery container, and wherein the main pipe of the first battery container is connected to the main pipe of a second battery container.

The first power line, the second power line and the third power line are configured to transmit DC power.

In addition, the battery system can further include a power convertor connected to the second power line of the control cabinet and configured to perform AC-DC conversion of the charge power and discharge power for the plurality of battery containers.

In addition, each of the plurality of battery containers can be configured to deliver the power of the plurality of battery containers.

In addition, the first power line can include a plurality of main connectors, and a main busbar configured to continuously extend between the plurality of main connectors.

In addition, the plurality of battery containers can be spaced a predetermined distance apart from each other in a horizontal direction, and a link busbar connects the main connectors of adjacent battery containers of the plurality of battery containers.

In addition, the plurality of main connectors can be disposed on an upper side of the container housing.

In addition, a plurality of battery racks can be included in the container housing, and connected in parallel to the first power line.

In addition, the control cabinet is connected to each of the plurality of battery containers via an AC power line.

In addition, two or more control cabinets can be included and connected to a power convertor, and the plurality of battery containers can be connected to each control cabinet.

In addition, the battery system according to the present disclosure can further include a firefighting cabinet configured to supply a fire extinguishing liquid to one of the plurality of battery containers.

In addition, the plurality of battery containers can be configured to deliver the fire extinguishing liquid between.

In addition, an energy storage system according to another aspect of the present disclosure includes the battery system according to the present disclosure.

Advantageous Effects

According to an aspect of the present disclosure, it is possible to provide the battery system that has improved operation efficiency or assembly and can reduce the construction cost and time.

In particular, in the case of the present disclosure, it is possible to provide the battery container with improved scalability that can easily respond to changes in the ESS value chain.

In addition, according to an aspect of the present disclosure, it is possible to provide an all in one outdoor enclosure product of system level that is easy to install on site and less costly, rather than a conventional indoor rack level product.

Moreover, according to an aspect of the present disclosure, in each battery of the battery system, transportation and installation can be performed in a state in which the battery module and various components are all mounted in one enclosure. Therefore, it is easy to transport to an ESS construction area, and it is possible to minimize on-site installation and improve convenience of scalability.

Therefore, according to an aspect of the present disclosure, it is possible to provide a turnkey solution rather than a component supplier.

In addition, according to an aspect of the present disclosure, it is possible to provide the energy storage system with high energy density.

In addition, according to an aspect of the present disclosure, it is possible to provide the battery container with improved fire safety.

Moreover, according to an aspect of the present disclosure, when the energy storage system is constructed using the plurality of battery containers, it is possible to improve the convenience of building a firefighting system.

Many other additional effects can be achieved by many other aspects of the present disclosure. These effects of the present disclosure will be described in detail in each aspect, or description of effects that can be easily understood by those skilled in the art is omitted.

DESCRIPTION OF DRAWINGS

The accompanying drawings illustrate exemplary aspects of the present disclosure and together with the following detailed description, serve to provide further understanding of the technical aspect of the present disclosure, and thus the present disclosure is not construed as being limited to the drawings.

BEST MODE

Hereinafter, exemplary aspects of the present disclosure will be described in detail with reference to the accompanying drawings. Prior to the description, it should be understood that the terms or words used in the specification and the appended claims should not be construed as limited to general and dictionary meanings, but rather interpreted based on the meanings and concepts corresponding to the technical aspect of the present disclosure on the basis of the principle that the inventor is allowed to define terms appropriately for the best explanation.

Therefore, the aspects described herein and illustrations in the accompanying drawings are exemplary aspects of the present disclosure to describe the technical aspect of the present disclosure and are not intended to be limiting, and thus it should be understood that a variety of other equivalents and modifications could have been made thereto at the time that the application was filed.

Meanwhile, in the present disclosure, the terms indicating directions such as up, down, left, right, front and back may be used, but these terms are only for convenience of description, and it is obvious to those skilled in the art that it may change depending on the location of the stated element or the location of the observer. In particular, in each drawing, unless otherwise specified, an X-axis direction may indicate a left-right direction, a Y-axis direction may indicate a front-back direction, and a Z-axis direction may indicate an up-down direction.

And, in the present disclosure, the term inside or outside may be used for each component, unless otherwise specified, inside may refer to a direction toward the center in each component, and outside may refer to the opposite direction.

In addition, the present disclosure may include many aspects, and for each aspect, identical or similar descriptions to other aspects are omitted and differences will be described below.

Figure 1:
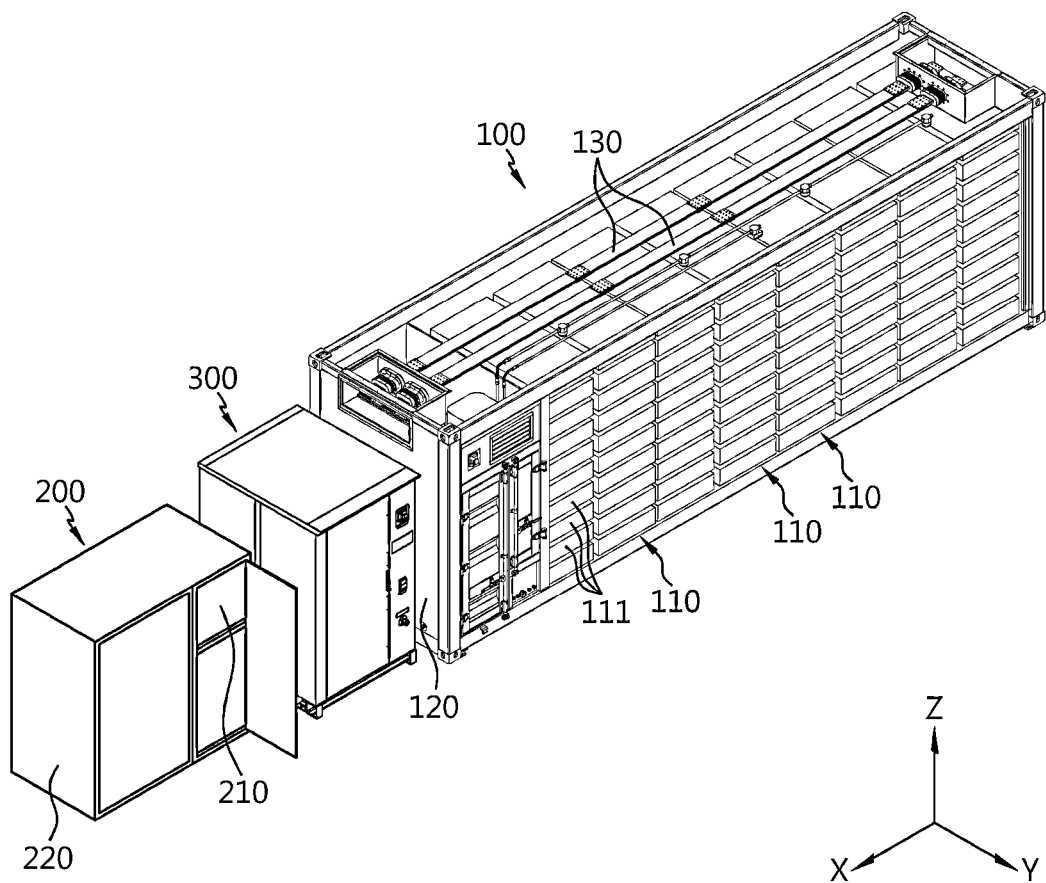
FIG. 1 is a perspective view schematically illustrating some components of a battery system according to an aspect of the present disclosure.

FIG. 1 is a perspective view schematically illustrating some components of a battery system according to an aspect of the present disclosure. In addition, FIG. 2 is a diagram schematically illustrating an electrical connection configuration of the battery system according to an aspect of the present disclosure.

Figure 2:
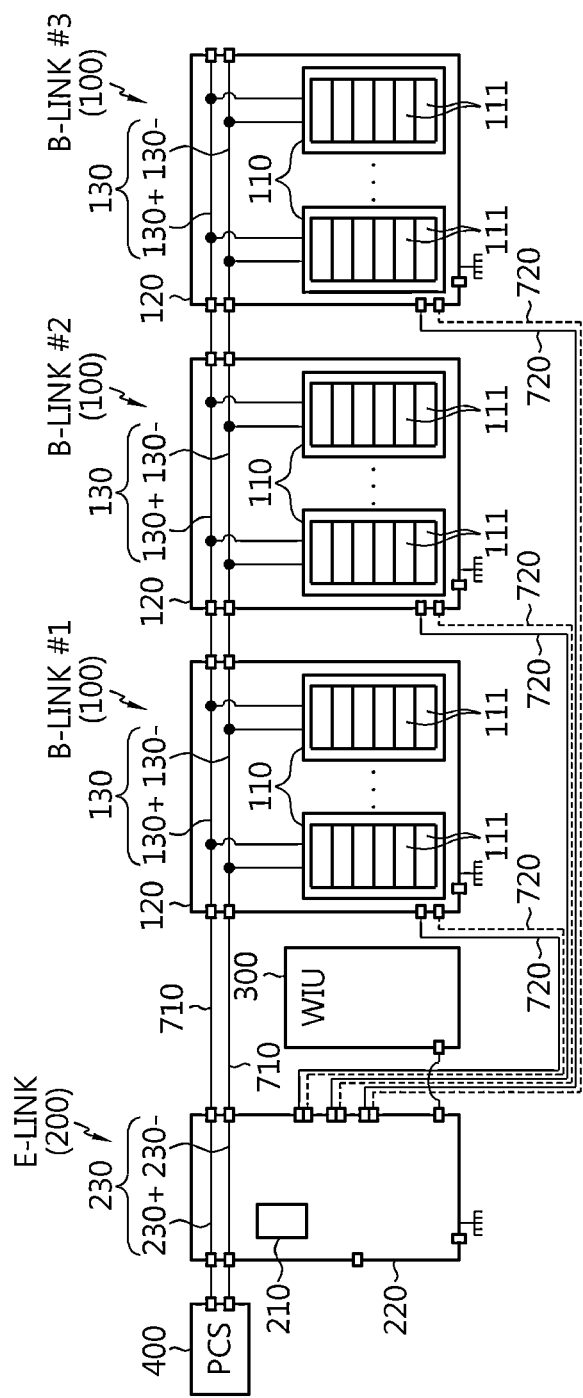
FIG. 2 is a diagram schematically illustrating an electrical connection configuration of a battery system according to an aspect of the present disclosure.

Referring to FIGS. 1 and 2, the battery system according to the present disclosure includes a battery container 100 and a control cabinet 200.

The battery container 100 can include a battery rack 110, a container housing 120, and a first power line 130.

The battery rack 110 can include a plurality of battery modules 111. Here, each battery module 111 can include a plurality of battery cells (secondary batteries) received in a module case. In addition, each battery module 111 can be stacked in a direction, for example, in a vertical direction to form a battery rack 110. In particular, the battery rack 110 can include a rack case to make it easy to stack the battery modules 111. In this case, each of the plurality of battery modules 111 can be received in each receiving space of the rack case to form a module stack. One module stack can constitute one battery rack 110. Alternatively, two or more module stacks can constitute one battery rack 110.

The battery modules 111 included in the battery rack 110 can further include a control unit such as a battery management system (BMS) for each battery module or each predetermined group. For example, each battery module 111 can include a pack BMS. In this case, each battery module 111 can be referred to as a battery pack. That is, the battery rack 110 can include a plurality of battery packs. In the following description, the battery module 111 can be replaced with the battery pack.

One or more battery racks 110 can be included in the battery container 100. In particular, a plurality of battery racks 110 can be included in the battery container 100. The plurality of battery racks 110 can be arranged in at least one direction, for example, a horizontal direction. For example, the battery container 100 can include eight battery racks 110 that can be arranged in the left-right direction (X-axis direction) in the battery container 100. When the plurality of battery racks 110 is included, each battery rack 110 can have a control unit, for example, a rack BMS. In this case, the rack BMS can be connected to the plurality of pack BMSs included in the corresponding battery rack 110 to transmit and receive data to/from the plurality of pack BMSs, and control them. Meanwhile, when one or more rack BMSs are included in the battery container 100, the rack BMS can be connected to a control device, for example, a control cabinet 200 outside of the battery container 100. Alternatively, when a plurality of rack BMSs is included in the battery container 100, the battery container 100 can further include an integrated control unit, for example, a battery processing unit (BPU) to perform communication and/or control operations with the plurality of rack BMSs.

The container housing 120 can have an empty internal space. The container housing 120 can accommodate the battery rack 110 in the internal space. More specifically, as shown in FIG. 1, the container housing 120 can be formed in the shape of an approximately rectangular prism. In this instance, the container housing 120 can include an upper housing, a lower housing, a front housing, a rear housing, a left housing and a right housing with respect to the internal space. In addition, the container housing 120 can accommodate the battery rack 110 in the internal space defined by these six unit housings.

The container housing 120 can be made of a material that ensures the strength of a predetermined level or more and stably protects the internal components from external physical and chemical factors. For example, the container housing 120 can be made of a metal such as steel or can include such a metal. In addition, the container housing 120 can include the same material as shipping containers.

In addition, the container housing 120 can have an identical or similar size to shipping containers. Moreover, the container housing 120 can conform to the predetermined dimensions of ship containers according to the ISO standards. For example, the container housing 120 can be designed with identical or similar dimensions to 20-feet containers or 40-feet containers. However, the size of the container housing 120 can be designed to have an appropriate size, shape, or material according to circumstances. In particular, the size or shape of the container housing 120 can be variously set according to the scale, shape and geometry of a system, for example, an energy storage system to which the battery container 100 is applied. The present disclosure may not be limited to the specific size, shape or material of the container housing 120.

The container housing 120 can include one or more doors E to make it easy to install, maintain or repair the internal components such as the battery rack 110. For example, the container housing 120 can include a plurality of doors E in the front housing and/or the rear housing.

The container housing 120 can be configured to be seated on the ground. Moreover, when the plurality of battery containers 100 is included in the battery system, each container housing 120 can be seated on the ground. In this case, the plurality of battery containers 100 can be arranged on the ground side by side in the horizontal direction. In addition, the plurality of battery containers 100 can be arranged on the ground, spaced a predetermined distance apart from each other in the horizontal direction. For example, referring to the exemplary configuration of FIG. 2, the plurality of battery containers 100 can be arranged side by side in the left-right direction, spaced the predetermined distance apart from each other.

The first power line 130 can be configured to transmit charge power and discharge power. That is, the first power line 130 can transmit the charge power supplied to the battery container 100 and/or the discharge power discharged from the battery container 100. In particular, the first power line 130 can deliver the charge power supplied to the battery rack 110 included in the battery container 100 and the discharge power discharged from the battery rack 110.

The first power line 130 can include an electrically conductive material, in particular, a metal to transmit the power. For example, the first power line 130 can be a plate-shaped conductor or a wire made of copper, covered with an insulator. In addition, as shown in FIG. 2, the first power line 130 can include two first unit lines, i.e., a first positive line indicated by 130+ and a first negative line indicated by 130−, to transmit the power.

The battery system according to the present disclosure can include the plurality of battery containers 100. For example, as shown in FIG. 2, one battery system can include three containers, i.e., a first container B-LINK #1, a second container B-LINK #2 and a third container B-LINK #3. The number of battery containers 100 can variously change.

As described above, when the plurality of battery containers 100 is included in the battery system, the plurality of battery containers 100 can be connected to each other with the first power line 130. For example, in the aspect of FIG. 2, the first power line 130 of the first container B-LINK #1 and the first power line 130 of the second container B-LINK #2 can be directly connected to each other. In addition, in the aspect of FIG. 2, the first power line 130 of the second container B-LINK #2 and the first power line 130 of the third container B-LINK #3 can be directly connected to each other.

In particular, the battery containers 100 located physically close to each other can be connected to each other with the first power line 130. For example, since the first container B-LINK #1 is located physically closer to the second container B-LINK #2 than the third container B-LINK #3, the first container B-LINK #1 can be connected to the second container B-LINK #2 with the first power line 130.

Also, since the third container B-LINK #3 is located closer to the second container B-LINK #2 than the first container B-LINK #1, the third container B-LINK #3 can be connected to the second container B-LINK #2 with the first power line 130. On the other hand, the first power line 130 of the third container B-LINK #3 is not directly connected to the first power line 130 of the first container B-LINK #1, and can be indirectly connected to the first power line 130 of the first container B-LINK #1 through the first power line 130 of the second container B-LINK #2.

In the above-described exemplary aspect, the first power lines 130 of the plurality of battery containers 100 can be connected in series. For example, in the exemplary configuration of FIG. 2, the first power lines 130 of the three battery containers 100 can be connected in line. In particular, each first power line 130 can include a first positive line 130+ and a first negative line 130−. Therefore, the first power lines 130 can be connected in series such that the first positive line 130+ is connected to the first positive line 130+ and the first negative line 130− is connected to the first negative line 130−.

The control cabinet 200 can include a control module 210, a cabinet housing 220 and a second power line 230.

The control module 210 can be configured to control the battery container 100 included in the battery system. In particular, when the plurality of battery containers 100 is included in the battery system, the control module 210 can control each of the plurality of battery containers 100. In addition, the control module 210 can monitor the condition of the plurality of battery containers 100 and integratively control them.

The control module 210 can transmit and receive data to/from the control unit, for example, the rack BMS, included in the plurality of battery containers 100 via communication. For example, the control module 210 can receive information of the battery rack 110 included in the battery container 100 such as voltage, current or state of charge from the rack BMS. The control module 210 can control the charging and discharging operation of the battery rack 110 based on the information. Alternatively, the control module 210 can receive sensing information from a sensor included in the battery container 100 and perform a variety of other control operations based on the received sensing information.

The control module 210 of the control cabinet 200 or the BMS included in the battery container 100 can be implemented in various names or types such as a processor, a microprocessor unit (MCU), an application specific integrated circuit (ASIC), a CPU or the like.

Figure 25:
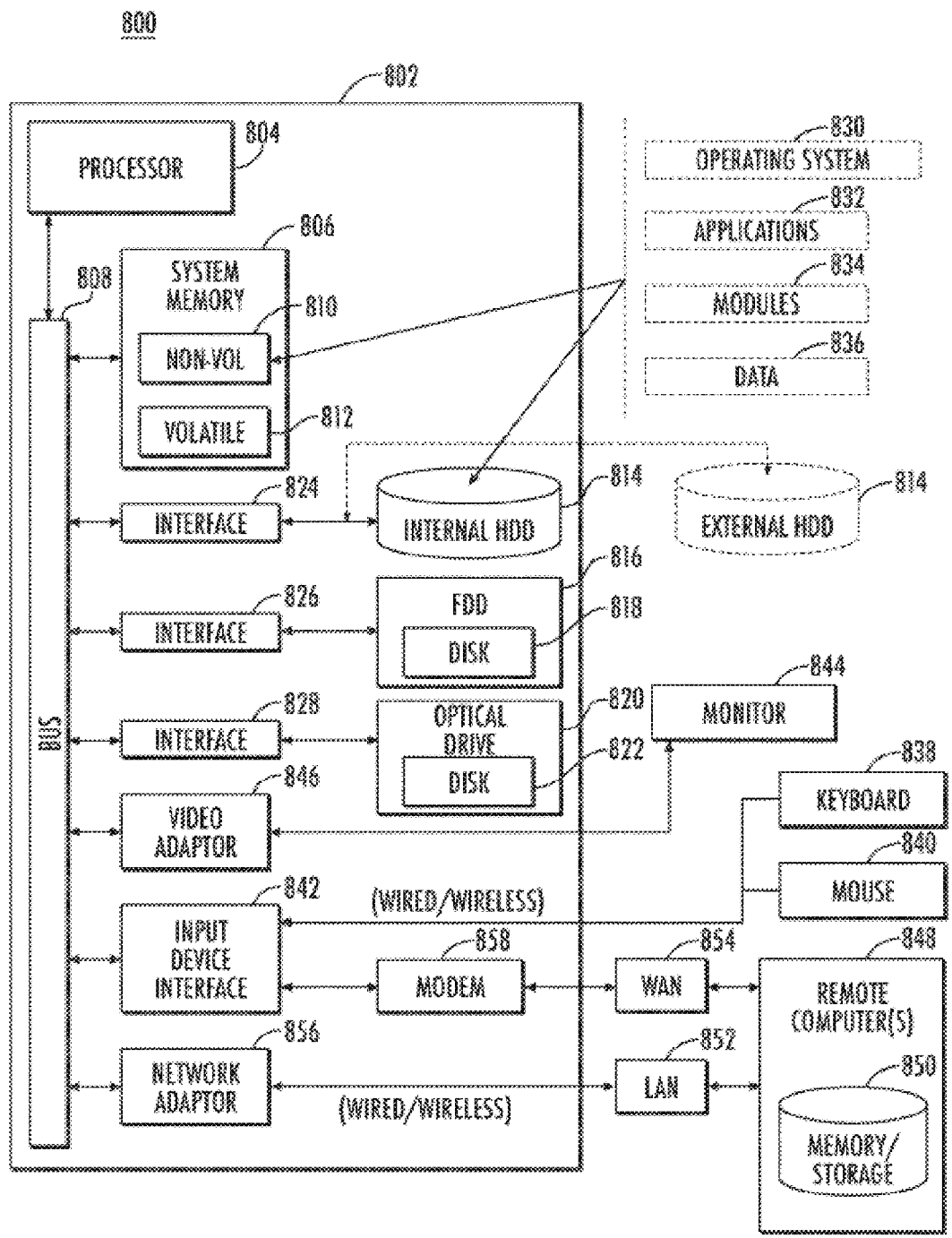
FIG. 25 is a diagram schematically illustrating a Battery Management System.

FIG. 25 illustrates an embodiment of an exemplary BMS architecture 800 comprising a computing system 802 that may be suitable for implementing various embodiments as previously described. In various embodiments, the computing architecture 800 may comprise or be implemented as part of an electronic device. In some embodiments, the computing architecture 800 may be representative, for example, of a system that implements one or more components of the battery system 100.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 802 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 802.

As shown in FIG. 25, the computing system 802 comprises a processor 804, a system memory 806 and a system bus 808. The processor 804 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 804.

The system bus 808 provides an interface for system components including, but not limited to, the system memory 806 to the processor 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 25, the system memory 806 can include non-volatile memory 810 and/or volatile memory 812. A basic input/output system (BIOS) can be stored in the non-volatile memory 810.

The computing system 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-readable instructions, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the battery systems 200.

A user can enter commands and information into the computing system 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computing system 802. In addition to the monitor 844, a computer typically includes other peripheral output devices, such as speakers, printers, and so forth.

The computing system 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computing system 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet. A network is one or more of the LAN 852 and the WAN 854.

When used in a LAN networking environment, the computing system 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computing system 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computing system 802, or portions thereof, can be stored in the remote memory/storage device 850. It will be appreciated that the network connections shown are exemplary and other means of establishing a communications link between the computers can be used.

The computing system 802 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints. The cabinet housing 220 can have an empty internal space, and can accommodate the control module 210 in the internal space. In particular, the cabinet housing 220 can be made of a metal such as steel to ensure the strength. In this aspect, in the same way as the battery container 100, the control cabinet 200 can be referred to as a control container. However, since the cabinet housing 220 does not include the battery rack 110 for storing the charge/discharge power of the battery system, the cabinet housing 220 can be smaller in size than the container housing 120.

The control cabinet 200 can be the component that is physically separated from the battery container 100. That is, the cabinet housing 220 forming the exterior of the control cabinet 200 can be disposed outside of the container housing 120 forming the exterior of the battery container 100. In particular, the control cabinet 200 can be spaced a predetermined distance apart from the container housing 120. Also, in the same way as the battery container 100, the control cabinet 200 can be configured to be seated on the ground. In particular, the control cabinet 200 can be arranged side by side on the ground together with the plurality of battery containers 100.

In the same way as the first power line 130, the second power line 230 can be configured to transmit the charge power and discharge power. In particular, the second power line 230 can be connected to the first power line 130.

Moreover, as shown in FIG. 2, the battery system according to the present disclosure can further include a link line 710. Here, the link line 710 can be connected between the control cabinet 200 and the battery container 100 to transmit the charge/discharge power between the control cabinet 200 and the battery container 100. In addition, the link line 710 can be configured to transmit the power between the first power line 130 and the second power line 230, and in the same way as the first power line 130 and the second power line 230, the link line 710 can include a positive line and a negative line. That is, as shown in FIG. 2, the second power line 230 can include two second unit lines, i.e., a second positive line indicated by 230+ and a second negative line indicated by 230− to transmit the power.

Moreover, when the battery system includes the plurality of battery containers 100, the first power line 130 included in one of the battery containers 100 can be connected to the second power line 230. For example, in the exemplary configuration of FIG. 2, when three battery containers 100 are included together with the control cabinet 200, the second power line 230 of the control cabinet 200 can be directly connected to the first power line 130 of the first container B-LINK #1. Here, the first power line 130 of the second container B-LINK #2 and the first power line 130 of the third container B-LINK #3 in non-connection with the second power line 230 can be indirectly connected to the second power line 230 through the first power line 130 of the first container B-LINK #1.

Moreover, the second power line 230 can be connected in series to the first power line 130. In particular, the second positive line 230+ can be connected in line to the first positive line 130+, and the second negative line 230− can be connected in line to the first negative line 130−.

In the same way as the first power line 130, the second power line 230 can be made of an electrically conductive material such as a metal. For example, the second power line 230 can be a conductive wire made of copper, covered with an insulator.

An end of the second power line 230, for example, the right end of the second power line 230 in FIG. 2, can be connected to the battery container 100, and the other end of the second power line 230, for example, the left end of the second power line 230 in FIG. 2, can be connected to a power grid. Accordingly, the control cabinet 200 can transmit the charge power and discharge power between the power grid and the plurality of battery containers 100 through the second power line 230. Meanwhile, the power grid as used herein can be the concept including power plants, electrical substations or their connected transmission lines and distribution lines as well as loads such as homes or factories. That is, the power grid can refer to a system connected to the battery system according to the present disclosure to transmit and receive the charge power or discharge power to/from the battery system in a broad sense.

According to the exemplary configuration of the present disclosure, the battery system that is easy to install can be provided. In particular, according to the above-described exemplary configuration, the battery system can include the plurality of battery containers 100 and the control cabinet 200 separately from the battery containers 100 as a group. In this instance, each battery container 100 and the control cabinet 200 can include the components in each enclosure (housing) in an all-in-one form. Therefore, in the operation of building the battery system including the plurality of battery containers 100 and the control cabinet 200, it can be very easy to transport and install on site.

In addition, according to the above-described exemplary configuration, when the control cabinet 200 and one battery container 100 are connected in the process of constructing the battery system, the other battery container 100 does not need to be directly connected to the control cabinet 200 in a power transmission path. Therefore, in the case of the battery container 100 far away from the control cabinet 200, the power transmission path can be connected to the adjacent battery container 100, and there is no need to directly connect the power transmission path to the control cabinet 200. Therefore, in this case, it is possible to improve the convenience of installation, and reduce the installation cost or time.

In addition, according to the exemplary configuration of the present disclosure, it can be easy to additionally install another battery container 100 after the construction of the battery system is completed. Therefore, it is possible to improve the scalability of the battery system or the energy storage system, and facilitate the scale adjustment.

In addition, according to the exemplary configuration of the present disclosure, the control cabinet 200 is included separately from the battery container 100. Accordingly, various operations of each battery container 100 can be controlled or monitored by the control cabinet 200. In this case, it is possible to eliminate or reduce the need to include the control unit for each battery container 100. Therefore, since each battery container 100 has a space for the control unit, thereby improving the energy density in each battery container 100. In addition, in this case, it is possible to reduce the manufacturing cost of the battery container 100 incurred to include the control unit.

As described above, the battery system according to the present disclosure can include the plurality of battery containers 100 and at least one control cabinet 200. In this instance, the plurality of battery containers 100 and the control cabinet 200 can be connected to each other with the transmission path of the charge and discharge power. The plurality of battery containers 100 and the control cabinet 200 can be connected to each other to build a link system. In this aspect, the battery container 100 is a B-LINK, and the control cabinet 200 can be referred to as an E-LINK. Also, the battery system according to the present disclosure can be referred to as a link system.

In the battery system according to the present disclosure, the plurality of battery containers 100 can have the same configuration. For example, in the exemplary configuration of FIG. 2, each of the three battery containers 100 can have the same configuration, and even though they exchange their positions, the battery system according to the present disclosure can be maintained. For example, in the exemplary configuration of FIG. 2, the second container B-LINK #2 can be disposed in the position of the first container B-LINK #1, and the first container B-LINK #1 can be disposed in the position of the second container B-LINK #2. That is, in the battery system according to the present disclosure, each battery container 100 can be manufactured in the same configuration, and does not need to be separately manufactured according to the position occupied in the battery system or the type of the battery system. Accordingly, it is easier to construct the battery system, and it is possible to reduce the cost and time.

The first power line 130 and the second power line 230 can be configured to transmit DC power. That is, the power delivered via the first power line 130 and the second power line 230 can be DC power.

For example, in the aspect of FIG. 2, the first power lines 130 of the first to third containers B-LINK #1~3 are connected to the second power line 230 of the control cabinet 200. In this instance, the first power line 130 and the second power line 230 can transmit DC power, not AC power. Accordingly, both the first power line 130 and the second power line 230 can be referred to as DC lines.

Here, since each battery container 100 and the control cabinet 200 can transmit DC power through the first power line 130 and the second power line 230, they do not need to include an AC/DC conversion module. In particular, the power supplied from the battery rack 110 in the discharging process of the battery rack 110 included in each battery container 100 can be DC power. In addition, the power for charging each battery rack 110 can also be DC power. Accordingly, the battery container 100 does not need to include a conversion unit for converting the charge/discharge power between AC and DC.

In the above-described exemplary configuration, each battery container 100 and the control cabinet 200 can be connected to each other in a DC manner through the first power line 130 and the second power line 230. Also, the battery system according to this aspect of the present disclosure can be referred to as a DC link system. In the case of the DC link system according to the present disclosure, the DC link system can be easily constructed by directly connecting the main power line to the control cabinet 200 for only one battery container 100 without directly connecting the main power line to the control cabinet 200 for the other battery container 100.

The battery system according to the present disclosure can further include a PCS 400.

The PCS 400 can refer to a power conversion system or a power conditioning system. The PCS 400 can be disposed outside of the control cabinet 200 and the battery container 100. Also, the PCS 400 can be connected to the second power line 230 of the control cabinet 200.

The PCS 400 can be configured to perform AC-DC conversion (AC-DC conversion) of charge and discharge power between the power system and the battery container 100. For example, the PCS 400 can convert AC power supplied from the power system into DC power and supply it to the control cabinet 200 and the battery container 100. In addition, the PCS 400 can convert DC power supplied from the battery container 100 via the control cabinet 200 into AC power and transmit it to the power system.

In the above-described exemplary configuration, since the power transmitted between the battery container 100 and the PCS 400 is DC power, the battery container 100 or the control cabinet 200 does not need an AC/DC conversion module. Accordingly, it is possible to simplify the shape or structure of the battery container 100 or the control cabinet 200.

The plurality of battery containers 100 included in the present disclosure can be configured to transmit the power between different battery containers 100. For example, each of the plurality of battery containers 100 can be configured to transmit the charge power supplied from the control cabinet 200 or the battery container 100 to the other battery container 100. In addition, each of the plurality of battery containers 100 can be configured to transmit the discharge power supplied from the battery container 100 to the control cabinet 200 or the other battery container 100.

In a more specific example, referring to the exemplary configuration of FIG. 2, the first container B-LINK #1 can transmit the discharge power of the second container B-LINK #2 and the third container B-LINK #3 to the control cabinet 200. In addition, the first container B-LINK #1 can transmit the charge power supplied from the control cabinet 200 to the second container B-LINK #2 and the third container B-LINK #3.

In addition, the second container B-LINK #2 can transmit the discharge power of the third container B-LINK #3 to the first container B-LINK #1 between the first container B-LINK #1 and the third container B-LINK #3. In addition, the second container B-LINK #2 can transmit the charge power of the third container B-LINK #3 from the first container B-LINK #1 to the third container B-LINK #3.

Meanwhile, since the first to third containers B-LINK #1~3 can have the same configuration, they can exchange their positions. For example, in the exemplary configuration of FIG. 2, the second container B-LINK #2 and the first container B-LINK #1 can exchange their positions. That is, when the second container B-LINK #2 is disposed in the position of the first container B-LINK #1, the second container B-LINK #2 can transmit the power supplied from the control cabinet 200 to the first container B-LINK #1.

In addition, each battery container 100 can be configured to transmit the power to the other battery container 100 or the control cabinet 200 without passing through the battery rack 110 included therein.

For example, in the exemplary configuration of FIG. 2, when the first container B-LINK #1 transmits the charge power from the control cabinet 200 to the second container B-LINK #2, the charge power can be directly transmitted without going through the battery rack 110 of the first container B-LINK #1. Also, when the first container B-LINK #1 transmits the discharge power of the second container B-LINK #2 to the control cabinet 200, the discharge power of the second container B-LINK #2 may not be supplied to the battery rack 110 included in the first container B-LINK #1.

In this case, it is possible to stably transmit the charge and discharge power for each battery container 100 without the influence of the condition of the battery container 100, in particular, the condition of the battery rack 110 included in the battery container 100 through which the charge and discharge power goes.

Figure 3:
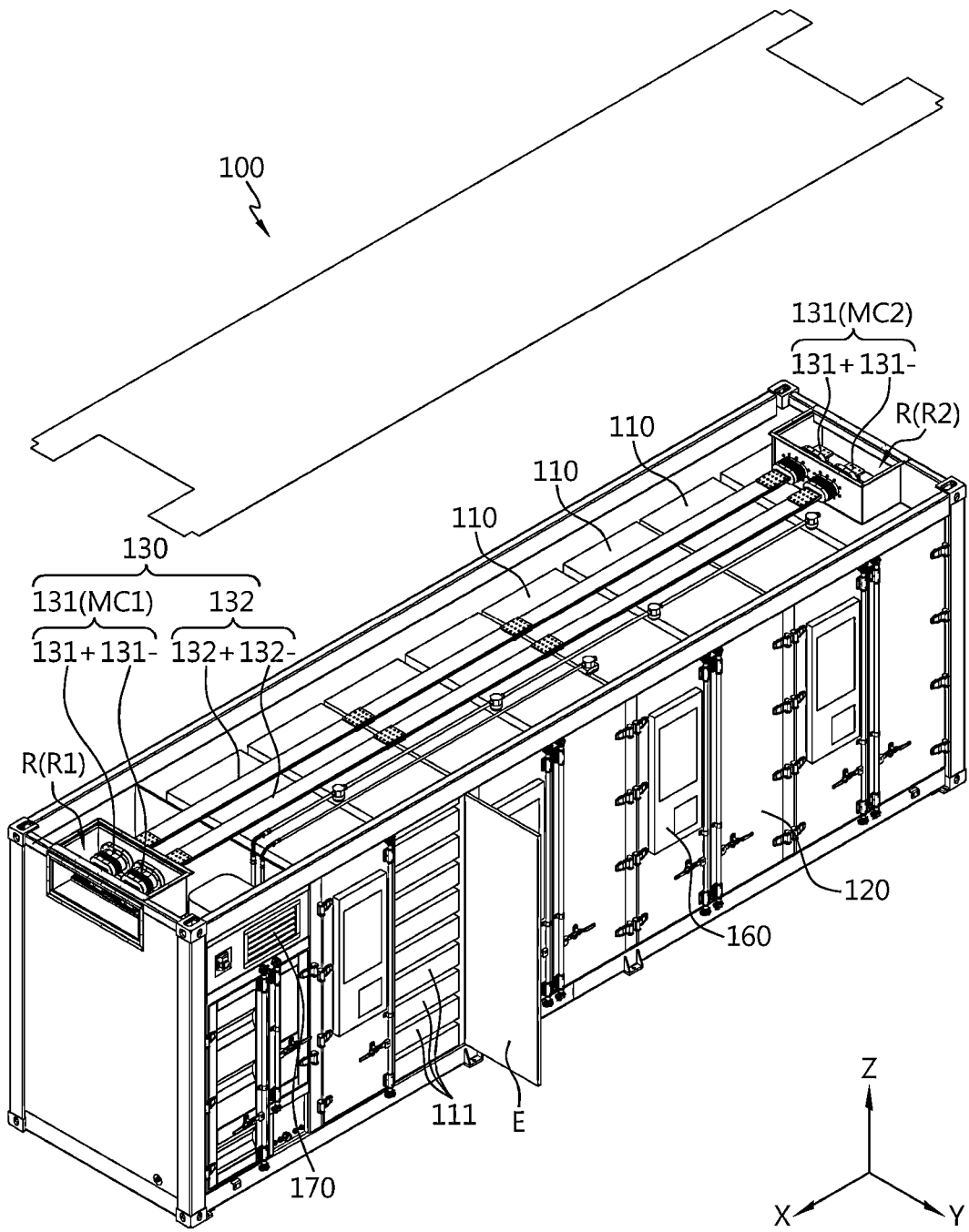
FIG. 3 is a perspective view schematically showing that some components of one battery container included in a battery system according to an aspect of the present disclosure are separated or moved.

FIG. 3 is a perspective view schematically showing that some components of one battery container included in the battery system according to an aspect of the present disclosure are separated or moved.

Referring to FIGS. 1 to 3, the first power line 130 can include a main connector 131 and a main busbar 132.

The main connector 131 can be configured to electrically connect the battery container 100 to an external component. That is, the main connector 131 can be configured to connect the battery container 100 to the external component, such as the first power line 130 of the other battery container 100 or the second power line 230 of the control cabinet 200.

The main connector 131 can be disposed on at least one side of the container housing 120. For example, the main connector 131 can be disposed on the left or right side of the container housing 120. Moreover, a plurality of main connectors 131 can be included in the battery container 100. For example, as shown in FIG. 3, the battery container 100 can include two main connectors 131, i.e., a first connector indicated by MC1 and a second connector indicated by MC2.

The plurality of main connectors 131 can be disposed on different sides of the container housing 120. Moreover, the plurality of main connectors 131 can be disposed on opposite sides of the container housing 120. For example, referring to the exemplary configuration of FIGS. 1 to 3, the first connector MC1 and the second connector MC2 can be disposed on the left and right sides of the container housing 120, respectively.

The main busbar 132 can continuously extend between the plurality of main connectors 131. For example, the main busbar 132 can be a power line that extends in a direction, for example, in the left-right direction. In this case, two ends of the main busbar 132 can be connected to different main connectors 131, such as the first connector MC1 and the second connector MC2. Also, the main busbar 132 can be a power transmission path between different main connectors 131, such as the first connector MC1 and the second connector MC2.

Accordingly, the main busbar 132 can transmit the discharge power supplied from the component connected to the second connector MC2, such as the second container B-LINK #2 to the first connector MC1. In addition, the main busbar 132 can transmit the charge power supplied from the component connected to the first connector MC1, such as the control cabinet 200, to the second connector MC2.

In addition, the main busbar 132 can be a transmission path of the charge power and discharge power for the battery rack 110 included in the corresponding battery container 100. To this end, the main busbar 132 can be electrically connected to each terminal of the battery module 111 provided in the battery rack 110. Accordingly, the main busbar 132 can be a transmission path of the charge power from the main connector 131 to the battery module 111. Also, the main busbar 132 can be a transmission path of the discharge power from the battery module 111 to the main connector 131.

The main busbar 132 can include two unit busbars, i.e., a positive busbar 132+ and a negative busbar 132−, to act as the power transmission path. The positive busbar 132+ can be connected to the positive terminal of the battery rack 110 or the positive terminal of the battery module 111 included therein. Then, the negative busbar 132− can be connected to the negative terminal of the battery rack 110 or the negative terminal of the battery module 111 included therein.

In addition, the main connector 131 can be separately provided at each end of the positive busbar 132+ and the negative busbar 132−. For example, the first connector MC1 and the second connector MC2 can be provided at the left and right ends of the positive busbar 132+, respectively. The first connector MC1 and the second connector MC2 provided at the two ends of the positive busbar 132+ can be the positive connector 131+. Also, the first connector MC1 and the second connector MC2 can be provided at the left and right ends of the negative busbar 132−, respectively. The two connectors provided at the two ends of the negative busbar 132−, i.e., the first connector MC1 and the second connector MC2 can be the negative connector 131−.

According to the above-described exemplary configuration, it is possible to construct the battery system including the plurality of battery containers 100 more easily.

In particular, in the battery system according to the present disclosure, the plurality of battery containers 100 can be arranged spaced a predetermined distance apart from each other in the horizontal direction. The battery system according to the present disclosure can further include a link busbar connecting the charge and discharge power path between the plurality of battery containers 100.

It will be described in more detail with further reference to FIGS. 4 to 6.

Figure 4:
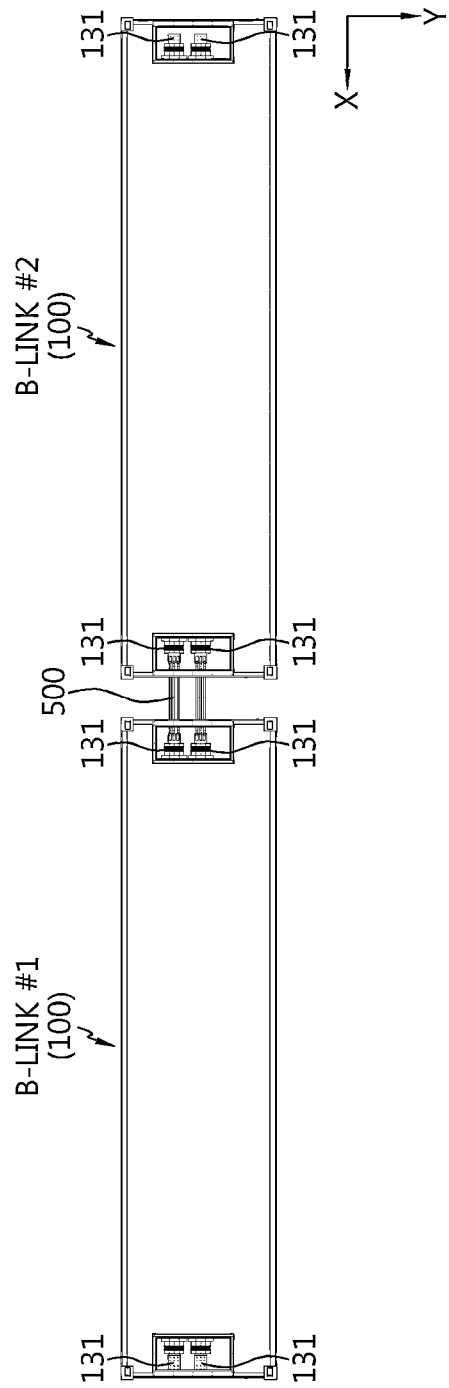
FIG. 4 is a top view schematically showing some components of a battery system according to an aspect of the present disclosure.

FIG. 4 is a top view schematically showing some components of the battery system according to an aspect of the present disclosure. In addition, FIG. 5 is a front view of FIG. 4, and FIG. 6 is an enlarged view of a connection portion between the battery containers 100 in the exemplary configuration of FIG. 4.

Figure 5:
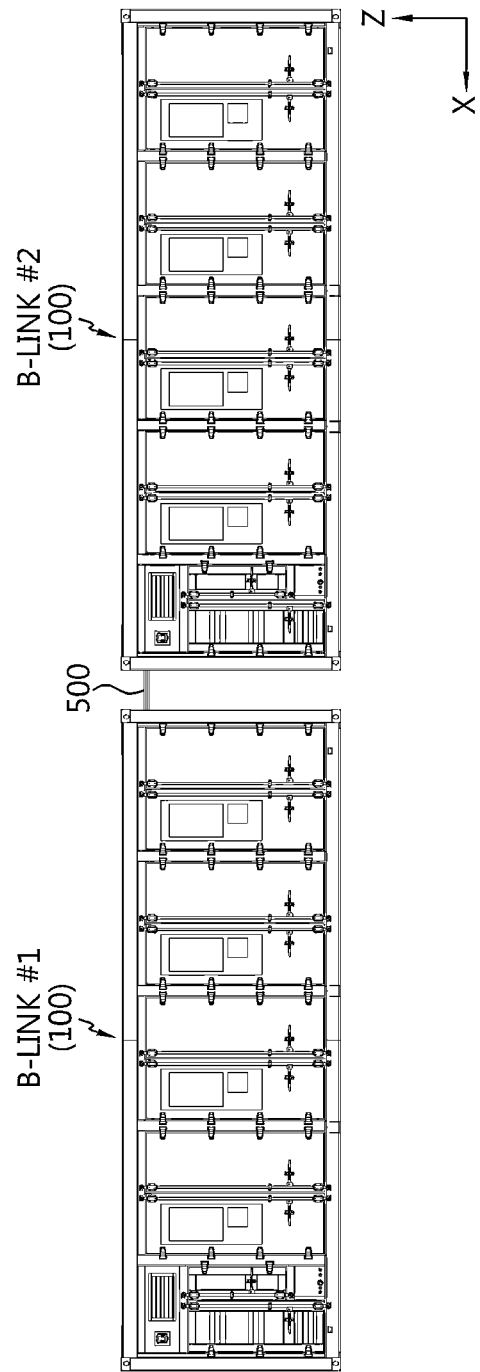
FIG. 5 is a front view of FIG. 4.
Figure 6:
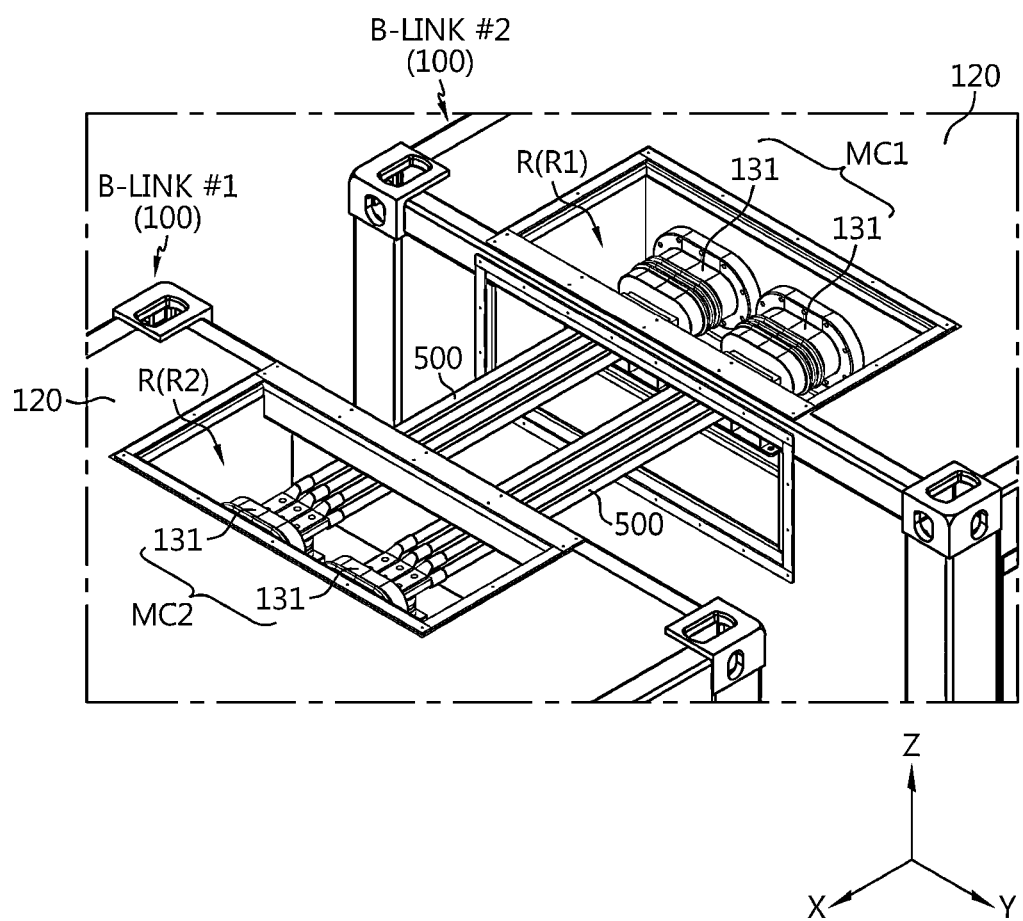
FIG. 6 is an enlarged view of a connection portion between battery containers in FIG. 4.

Referring to FIGS. 4 to 6, two battery containers 100 having the same configuration, i.e., the first container B-LINK #1 and the second container B-LINK #2 are shown. In particular, the first container B-LINK #1 and the second container B-LINK #2 can be arranged side by side in the lengthwise direction, i.e., in the left-right direction.

Also, the two battery containers 100 can be connected to each other through the main connector 131. To this end, the two battery containers 100 can be arranged with their sides having the main connectors 131 facing each other. For example, in the exemplary configuration of FIGS. 4 to 6, the two battery containers 100 can have the main connectors 131 on the left side and the right side, and can be arranged side by side in the left-right direction with their sides having the main connectors 131 facing each other. In particular, the two battery containers 100 disposed in the left-right direction can be connected to each other through the right main connector 131 of the first container B-LINK #1 on the left side and the left main connector 131 of the second container B-LINK #2 on the right side.

In this instance, the two battery containers 100 can be spaced the predetermined distance apart from each other in view of factors such as tolerance, convenience of installation, physical damage prevention and heat blocking. For example, the first container B-LINK #1 and the second container B-LINK #2 can be arranged in the left-right direction at a distance of 10 cm to 20 cm between the two containers.

The link busbar 500 may be configured to connect the main connectors 131 of different battery containers 100 facing each other. For example, in the exemplary configuration of FIGS. 4 to 6, the link busbar 500 may be, at two ends, connected to the main connector 131 on the right side of the first container B-LINK #1 and the main connector 131 on the left side of the second container B-LINK #2 facing each other, to transmit the power between them. The link busbar 500 acts as a third power line to connect the first power line 130 of the first container to the first power line 130 of the second container.

Moreover, since the main connector 131 includes the positive connector 131+ and the negative connector 131−, the link busbar 500 can also include two link busbars 500, i.e., a positive link busbar and a negative link busbar as shown in FIGS. 4 and 6.

In particular, since the main connector 131 of each battery container 100 is connected to the main busbar 132, the link busbar 500 can be configured to connect the main busbars 132 of different containers. In particular, since the main busbar 132 can be configured to transmit the charge and discharge power for the battery container 100, the link busbar 500 can be configured to transmit the charge and discharge power between different battery containers 100. For example, in the aspect shown in FIGS. 4 to 6, the link busbar 500 can transmit the charge/discharge power between the first container B-LINK #1 and the second container B-LINK #2. More specifically, the power for charging the battery rack 110 included in the second container (B-LINK #2) can be transmitted from the first power line 130 of the first container B-LINK #1 to the first power line 130 of the second container B-LINK #2 through the link busbar 500. In addition, the discharge power for the battery rack 110 of the second container B-LINK #2 can be transmitted from the first power line 130 of the second container B-LINK #2 to the first power line 130 of the first container B-LINK #1 through the link busbar 500.

According to the above-described exemplary configuration, in the two adjacent battery containers 100 with the main connectors facing each other, when two ends of the link busbar 500 are connected to the main connectors of the two battery containers 100, it is possible to easily achieve the power connection configuration between the two battery containers 100. In particular, in the system according to the present disclosure, each battery container 100 can provide the transmission path of the charge and discharge power for different battery containers 100. Accordingly, there is no need to separately provide the power path for connection to the external power system or the like for each battery container 100. For example, in the above-described exemplary configuration, when the first container B-LINK #1 is connected to the power system, the second container B-LINK #2 can be connected to the first container B-LINK #1 without needing to connect the second container B-LINK #2 to the power system. Accordingly, there is no need for the long power path for the second container B-LINK #2. Furthermore, according to the above-described exemplary configuration, the link busbar 500 can have a length equivalent to the distance between the two adjacent battery containers 100. Therefore, in constructing the battery system using the plurality of battery containers 100, it is possible to improve the convenience of installation and the ease of assembly and reduce the cost or time.

In addition, according to the battery system according to an aspect of the present disclosure, it is possible to improve the convenience of scalability. For example, in the exemplary configuration of FIGS. 4 and 5, another battery container 100, for example, a third container B-LINK #3 can be easily connected to the rear end of the second container B-LINK #2 using the link busbar 500. In this instance, the third container B-LINK #3 can have the same configuration as the first container B-LINK #1 and the second container B-LINK #2, and does not need to be configured differently form from the first container B-LINK #1 and the second container (B-LINK #2) for system expansion. In this case, it is possible to easily expand the capacity or output of the battery system.

The main busbar 132 can be disposed in the internal space of the container housing 120. That is, the main busbar 132 can be embedded in the container housing 120 and may not be exposed to the outside. For example, as shown in FIG. 3, the main busbar 132 can be disposed on bottom of the upper housing, in particular, on top of the battery rack 110. That is, the main busbar 132 can be embedded in a space between the battery rack 110 and the upper housing within the container housing 120.

According to the above-described exemplary configuration of the present disclosure, since the main busbar 132 is embedded in the battery container 100, it is possible to transport and install the main busbar 132 together only by transporting and installing the battery container 100. In addition, according to the above-described exemplary configuration, it is possible to eliminate or minimize the exposure of the power transmission path of the main busbar 132, thereby reducing the risk of damage to the power transmission path and the possibility of electric leakage. Accordingly, it is possible to improve safety of the battery container 100 or the battery system or the energy storage system including the same.

In addition, in the above-described exemplary configuration, since the main busbar 132 is disposed on the battery rack 110, it is possible to avoid or minimize interferences of the battery rack 110 with the main busbar 132 in the internal space of the container housing 120. Accordingly, it is possible to improve the ease of manufacture of the battery container 100 and minimize the length of the main busbar 132. In particular, in the case of the above-described aspect, the main busbar 132 can extend in a straight line shape and does not need to be curved.

The plurality of main connectors 131 can be exposed through the container housing 120. For example, referring to the exemplary configuration of FIGS. 3 and 4, the two main connectors 131 can be exposed through the container housing 120. In particular, the plurality of main connectors 131 can be disposed on the outer surface of the container housing 120. That is, the main connector 131 can be present on the outer wall of the container housing 120, not the internal space.

In this case, workers do not need to enter the container housing 120, and the process of connecting to the main connector 131 can be easily performed outside of the container housing 120. Accordingly, it is possible to perform the connection operation between the battery containers 100 more easily. Therefore, it is possible to further improve the convenience of installation or expansion of the battery container 100.

Also, the main connector 131 can be disposed on the container housing 120. For example, as shown in FIGS. 3 to 6, the main connector 131 can be provided on each of the left side and right side of the container housing 120. In this case, it is possible to perform the connection operation between the main connectors 131 more easily.

For example, referring to FIG. 6, the second connector MC2 can be provided as the main connector 131 on the right side of the first container B-LINK #1, and the first connector MC1 can be provided as the main connector 131 on the left side of the second container B-LINK #2. In this instance, the second connector MC2 and the first connector MC1 can be disposed on the first container B-LINK #1 and the second container B-LINK #2, respectively. Moreover, the second connector MC2 and the first connector MC1 can be exposed to the outside.

In the exemplary configuration, the worker can move to the upper side of the first container B-LINK #1 and the second container B-LINK #2, and easily connect the link busbar 500 between the exposed second connector MC2 and the exposed first connector MC1. Moreover, the worker does not need to enter the space between the battery containers 100 to connect the two battery containers 100. In this case, it is possible to improve operation efficiency and minimize the space between the two battery containers 100. Therefore, it is possible to contribute to the improvement in energy density of the energy storage system or reduction in installation space.

In addition, according to the above-described exemplary configuration, since the high-voltage connector is disposed above high from the ground, it is possible to reduce the risk of flooding or electric leakage. In addition, when the size of the battery container 100 is equal to or larger than a predetermined level like shipping containers, it is possible to reduce the likelihood of contact with the main connector 131 during the movement of the worker, thereby preventing electric shock accidents.

Meanwhile, when the main connector 131 is disposed on the container housing 120, the main busbar 132 connected between the main connectors 131 in one battery container 100 can be disposed at the upper part of the internal space of the container housing 120. In particular, as described in the previous aspect, the main busbar 132 can be disposed on the battery rack 110. In this case, it is possible to reduce the length of the main busbar 132 and minimize interferences with the battery rack 110, thereby reducing the manufacturing cost of the battery container 100 or improving productivity.

The container housing 120 can have a connector accommodating portion, as indicated by R in FIGS. 3 and 6. In particular, when the plurality of main connectors 131 are included in the battery container 100, a plurality of connector accommodating portions R can also be formed. For example, as in the configuration shown in FIG. 3, when the two main connectors 131 are disposed on the left and right sides of the battery container 100, the connector accommodating portion R can include a first accommodating portion R1 on the left side of the container housing 120 and a second accommodating portion R2 on the right side of the container housing 120.

The connector accommodating portion R can be formed in a concave shape in an inward direction on at least one side of the container housing 120. Also, the main connector 131 can be disposed in the connector accommodating portion R of the container housing 120. In particular, the connector accommodating portion R is concave in the inward direction in the container housing 120, but can correspond to the outer wall area of the container housing 120. Therefore, the main connector 131 is provided on the outer wall of the container housing 120, but the outer wall of the container housing 120 itself can be concave inwards. Therefore, the main connector 131 can be disposed in the inwardly concave area of the outer wall of the container housing 120.

According to the above-described exemplary configuration of the present disclosure, it is possible to minimize the exposure of the main connector 131 which is exposed to the outside to make it easy to connect the connection member including the link busbar 500 to the main connector 131. Accordingly, it is possible to protect the main connector 131 and the link busbar 500 connected thereto while improving the operation efficiency or convenience of installation when connecting the connecting member to the main connector 131. That is, since the main connector 131 is disposed in the connector accommodating portion R corresponding to the concave area of the container housing 120, it is possible to reduce the external exposure of the main connector 131, thereby improving the protection performance for the connection portion of the main connector 131 or the link busbar 500 connected thereto. In addition, in this case, the main connector 131 can be easily protected by covering the open area of the concave area.

In particular, the connector accommodating portion R can be disposed at the top edge of the container housing 120. For example, in the aspect of FIG. 6, the second accommodating portion R2 of the first container B-LINK #1 can be disposed at the top right edge of the container housing 120. Also, in the aspect of FIG. 6, the first accommodating portion R1 of the second container B-LINK #2 can be disposed at the top left edge of the container housing 120.

In addition, the connector accommodating portion R can be formed such that the main connector 131 is open in the upward and lateral directions. Here, the lateral direction can be a direction in which the adjacent other battery container 100 is disposed. For example, in the exemplary configuration of FIG. 6, the second accommodating portion R2 of the first container B-LINK #1 can be open in the upward and right directions. Accordingly, the main connector 131 of the first container B-LINK #1 can be exposed in the upward and right directions. Also, the first accommodating portion R1 of the second container B-LINK #2 can be open in the upward and left directions. Accordingly, the main connector 131 of the second container B-LINK #2 can be exposed in the upward and left directions. In this case, the second accommodating portion R2 of the first container B-LINK #1 and the first accommodating portion R1 of the second container B-LINK #2 can be open in a direction in which they face each other. Therefore, the two main connectors 131 received in the connector accommodating portion R can be disposed such that they face each other. In this case, the link busbar 500 can be extended and coupled in a straight line between the two main connectors 131.

According to the above-described exemplary configuration of the present disclosure, it is possible to construct the battery system more easily. For example, as shown in FIG. 6, when the two battery containers 100 are disposed adjacent to each other in the left-right direction, each main connector 131 can be exposed in the upward and lateral directions of the area in which the battery containers 100 are disposed adjacent to each other. Therefore, the worker can install or replace the link busbar 500 more easily with respect to the exposed main connector 131.

Figure 7:
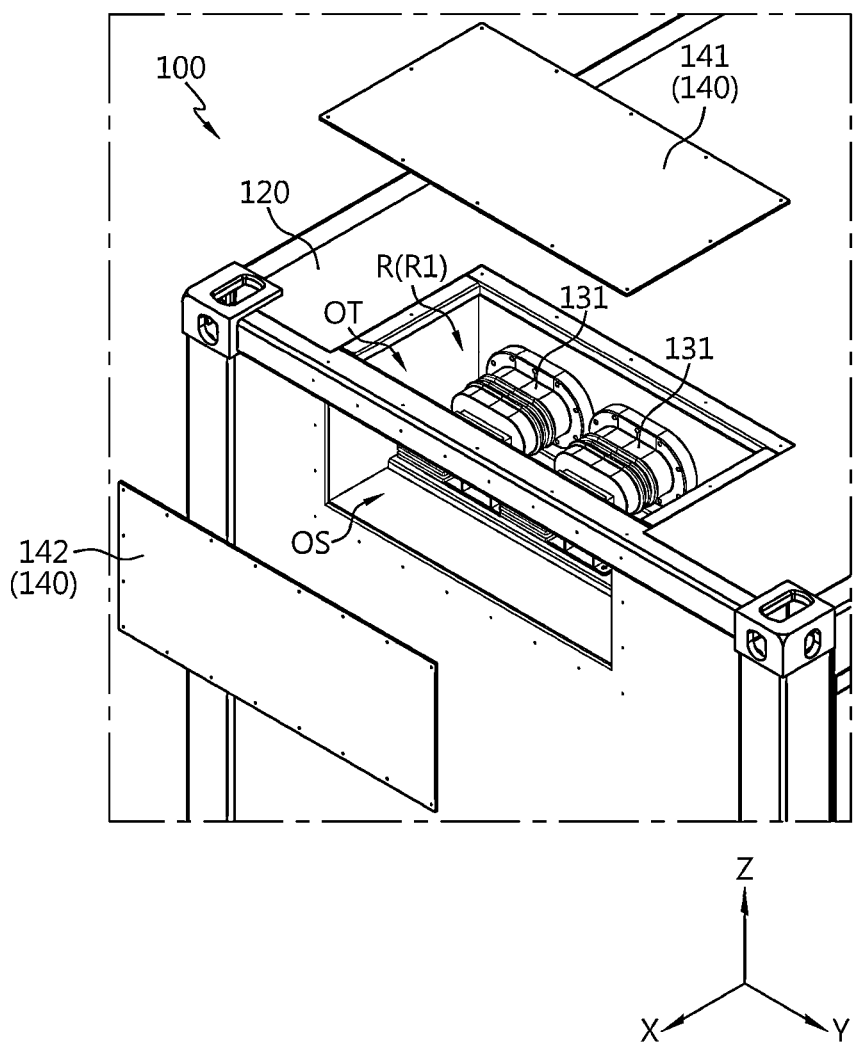
FIG. 7 is an exploded perspective view schematically illustrating some components of a battery container included in a battery system according to another aspect of the present disclosure.
Figure 8:
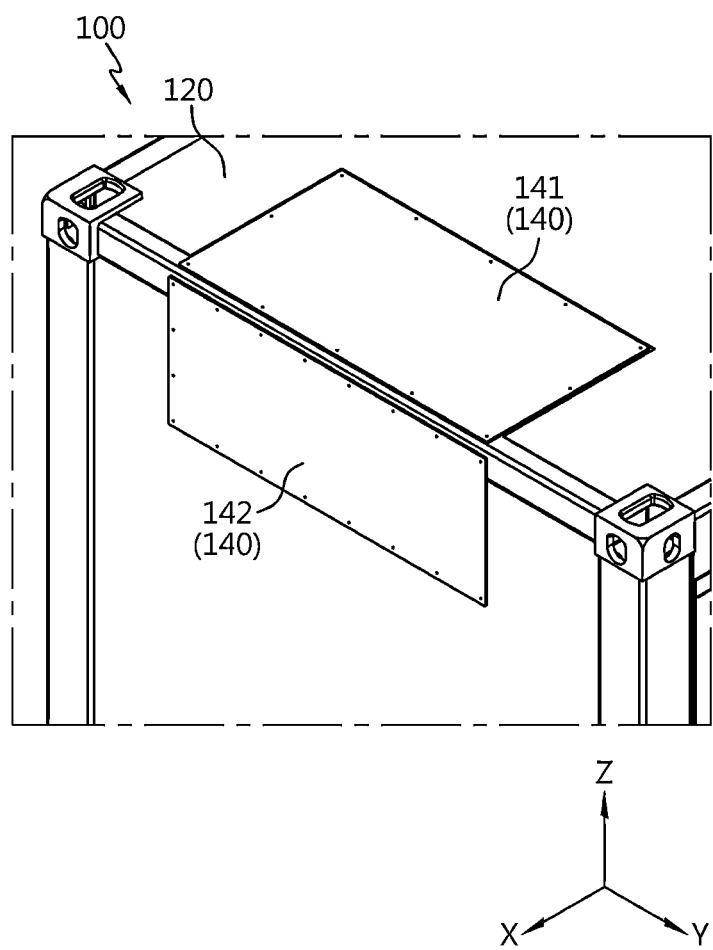
FIG. 8 is a combined perspective view of FIG. 7.

FIG. 7 is an exploded perspective view schematically illustrating some components of the battery container included in the battery system according to another aspect of the present disclosure. In particular, FIG. 7 can be an enlarged view of the left part of the battery container 100 according to the present disclosure. FIG. 8 is a combined perspective view of FIG. 7.

Referring to FIGS. 7 and 8, the battery container 100 according to the present disclosure can further include a connector cover 140. The connector cover 140 can cover the outer side of the connector accommodating portion R. That is, the connector accommodating portion R can be where the outer wall of the container housing 120 is concave inwards, and the connector cover 140 can be configured to cover the outer side of the concave portion. In particular, the connector cover 140 can be configured to cover the main connector 131 received in the connector accommodating portion R.

Furthermore, the connector cover 140 can be configured to open and close it to expose the connector accommodating portion R or prevent the exposure of the connector accommodating portion R. For example, the connector cover 140 can completely close the accommodating portion R to prevent the exposure of the main connector 131. Also, the connector cover 140 can open at least a part of the connector accommodating portion R to expose the main connector 131 to the outside. In this instance, when the main connector 131 is exposed to the outside, the link busbar 500 or the link line 710 can be connected to the main connector 131 through the exposed portion.

The connector cover 140 can include at least one of an upper cover 141 or a side cover 142. The upper cover 141 can be configured to close or open the top of the connector accommodating portion R. That is, the upper cover 141 can be configured to cover a top open portion indicated by OT in the open portion of the first accommodating portion R1. In addition, the side cover 142 can be configured to close a side open portion indicated by OS in the open portion of the connector accommodating portion R. For example, as shown in FIGS. 7 and 8, the side cover 142 can be configured to cover a left open portion in the first accommodating portion R1.

Furthermore, the connector cover 140 can be configured to detach from the connector accommodating portion R of the container housing 120 in at least part. For example, as shown in FIG. 7, the upper cover 141 and the side cover 142 can be configured to be completely separated from the connector accommodating portion R.

According to the above-described exemplary configuration of the present disclosure, the exposure of the main connector 131 disposed outside of the container housing 120 can be appropriately adjusted according to circumstances. Thus, it is possible to protect the main connector 131 or the connecting member connected thereto. For example, as shown in FIG. 8, the upper cover 141 and the side cover 142 can close the open portion of the connector accommodating portion R during the transportation of the battery container 100, thereby preventing damage to the main connector 131 or an electric shock accident. And, as shown in FIG. 7, the upper cover 141 and the side cover 142 can be separated from the connector accommodating portion R to open the connector accommodating portion R during the installation of the battery container 100. Accordingly, the operator can easily connect the connection member such as the link busbar 500 to the main connector 131 through the open portion.

Meanwhile, only a part of the connector cover 140 can be coupled to the connector accommodating portion R, so that a part of the connector accommodating portion R is open and the other part is closed. For example, after the connection operation of the battery container 100 is completed, the upper cover 141 can be coupled to the connector accommodating portion R again to close the top portion OT of the connector accommodating portion R. In this case, the side portion OS of the connector accommodating portion R can be open to provide a passage through which the link busbar 500 can pass, and the top portion can be closed to prevent rainwater, dust or other foreign matters from entering from the top. Therefore, after the connection of the battery container 100 is completed, it is possible to protect the main connector 131 and the link busbar 500 and prevent an electric shock accident.

Figure 9:
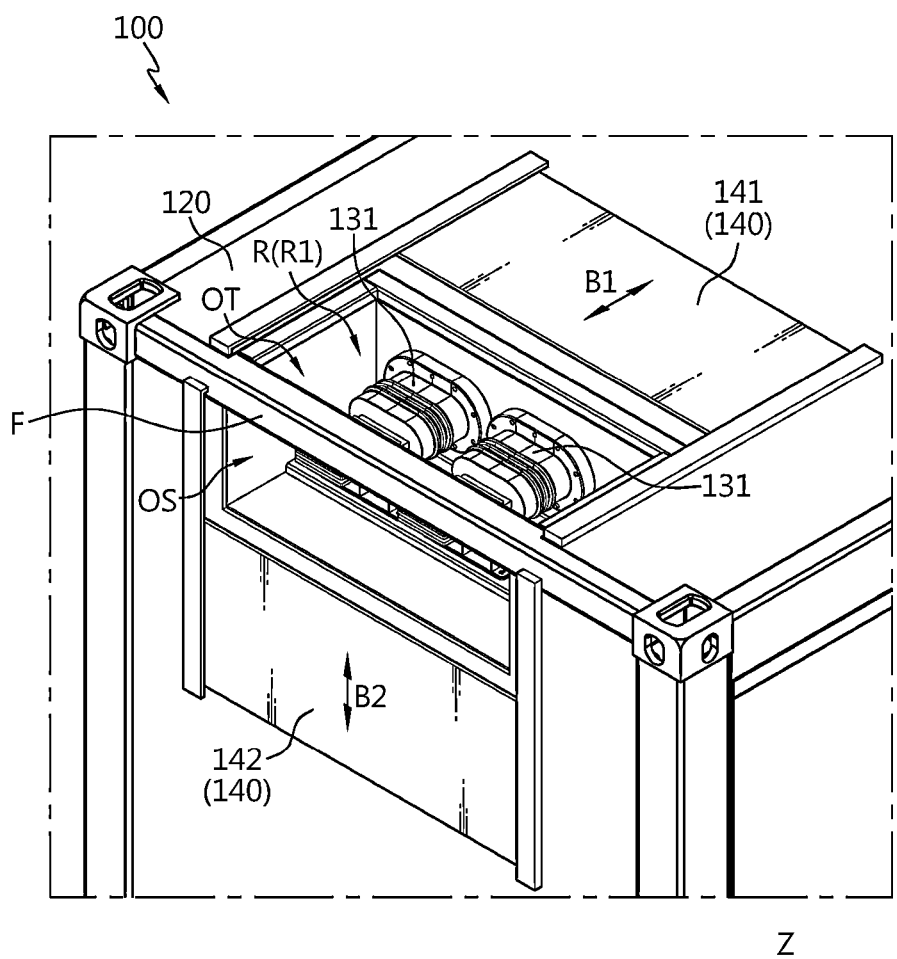
FIG. 9 is a diagram schematically illustrating some components of a battery container included in a battery system according to another aspect of the present disclosure.

FIG. 9 is a diagram schematically illustrating some components of the battery container 100 included in the battery system according to another aspect of the present disclosure.

Referring to FIG. 9, the connector cover 140 can be configured to slide on the container housing 120.

More specifically, the upper cover 141 can be configured to slide in the horizontal direction (left-right direction) on the upper surface of the container housing 120 as indicated by the arrow B1 in FIG. 9. Also, the upper cover 141 can be configured to open and close the top open portion OT of the connector accommodating portion R by the sliding motion. For example, in the process of coupling the link busbar 500 to the main connector 131, the upper cover 141 can slide in the -X-axis direction to open the top portion of the connector accommodating portion R, thereby improving the worker's convenience of installation to connect the link busbar 500. And, when the connection operation is completed, the upper cover 141 can slide in the +X-axis direction to close the connector accommodating portion R.

In addition, the side cover 142 can be configured to slide on the side surface of the container housing 120 in the vertical direction (up-down direction) as indicated by the arrow B2 in FIG. 9. Then, the side cover 142 can be configured to open and close the side open portion OS of the connector accommodating portion R through the sliding operation. For example, in the transportation process of the battery container 100, the side cover 142 can be kept in upward slid state to close the side portion of the connector accommodating portion R. And, after the transportation of the battery container 100 is completed, the side cover 142 can slide down to expose the side of the connector accommodating portion R and connect the connection member such as the link busbar 500.

Meanwhile, the container housing 120 can further include a coupling reinforcement portion as indicated by F in FIG. 9. The coupling reinforcement portion F can be disposed in the connector accommodating portion R of the container housing 120. In particular, the coupling reinforcement part F can extend along the edge of the container housing 120. Furthermore, the coupling reinforcement portion F can be disposed at the edge portion at which the connector accommodating portion R is formed, to divide the open portion of the connector accommodating portion R in the upward direction and side direction.

The coupling reinforcement portion F can be configured to fasten and fix the components included in the battery container 100 of the present disclosure or components necessary for constructing the energy storage system using the battery container 100. For example, the coupling reinforcing portion F can couple and fix the connector cover 140 described in the aspect shown in FIGS. 7 and 8. More specifically, the coupling reinforcement part F can have a fastening hole, protrusion or hook to fasten and fix the upper cover 141 or the side cover 142.

Figure 10:
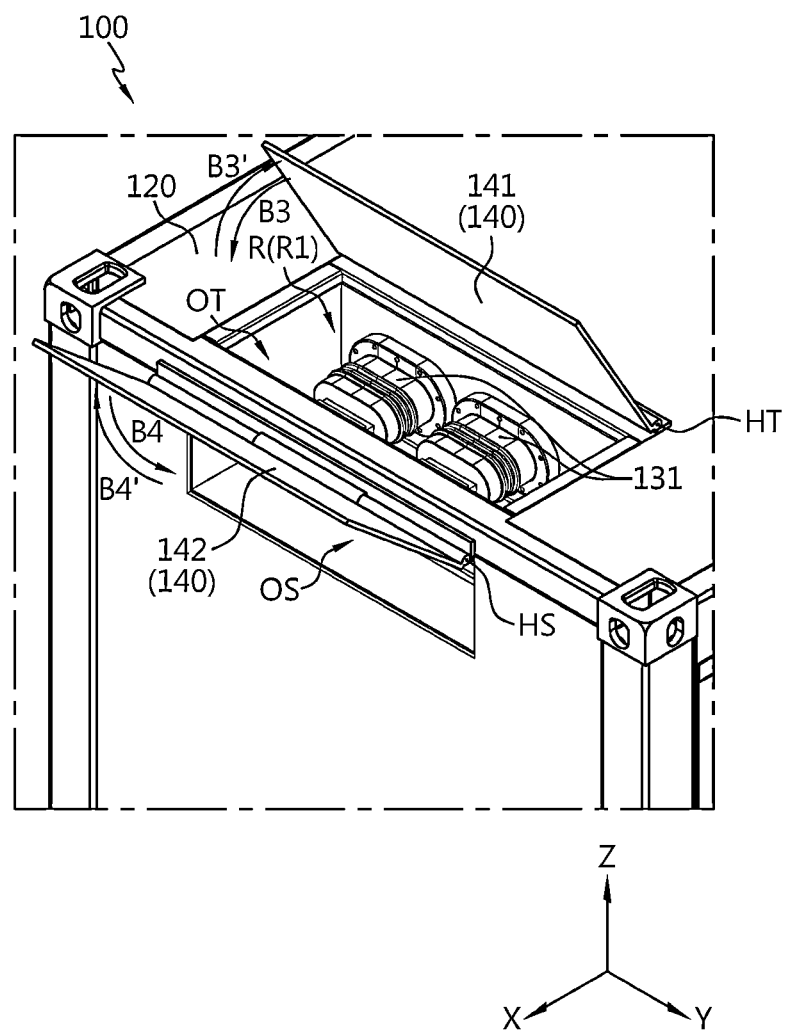
FIG. 10 is a diagram schematically illustrating some components of a battery container included in a battery system according to another aspect of the present disclosure.

FIG. 10 is a diagram schematically illustrating some components of the battery container 100 included in the battery system according to another aspect of the present disclosure.

Referring to FIG. 10, the connector cover 140 can be configured to hinge-pivot with respect to the container housing 120.

More specifically, the upper cover 141 can configured to be, at one end, hinge-coupled to the upper surface of the container housing 120 as indicated by HT and rotatably move as indicated by the arrows B3 and B3'. Also, the upper cover 141 can be configured to open and close the top open portion OT of the connector accommodating portion R through the rotation operation. For example, during the transportation of the battery container 100, the upper cover 141 can rotate as indicated by B3, to keep the top open portion OT of the connector accommodating portion R in closed state. And, when the battery container 100 is seated in a specific position for building the energy storage system, the upper cover 141 can rotatably move as indicated by B3' to open the top open portion OT of the connector accommodating portion R. In this case, the worker can easily connect the connection member such as the link busbar 500 to the main connector 131 through the top open portion of the connector accommodating portion R. And, when the connection operation of the main connector 131 is completed, the upper cover 141 can rotatably move as indicated by B3 to close the top open portion OT of the connector accommodating portion R again.

In addition, the side cover 142 can be configured to be, at one end, hinged to the side of the container housing 120 like a portion indicated by HS, and rotatably move as indicated by the arrows B4 and B4'. In addition, the side cover 142 can be configured to open and close the open side surface OS of the connector accommodating portion R through the rotation operation. For example, during the transportation of the battery container 100, the side cover 142 can rotate as indicated by B4 to keep the open side surface OS of the connector accommodating portion R in closed state. And, when the battery container 100 is seated in the specific position for building the energy storage system, the side cover 142 can rotate as indicated by B4' to open the open portion side surface OS of the connector accommodating portion R. In this case, the worker can easily connect the connection member such as the link busbar 500 to the main connector 131 through the side open portion OS of the connector accommodating portion R. Meanwhile, even after the connection operation of the main connector 131 is completed, the side cover 142 can be kept open to allow the link busbar 500 to pass through the open side surface OS of the connector accommodating portion R.

According to the above-described exemplary configuration of the present disclosure, it is easy to open and close the connector cover 140, and keep the connector cover 140 in coupled state to the container housing 120 irrespective of the opening and closing operation. Accordingly, it is easier to open and close the connector cover 140 and it is possible to eliminate the likelihood of loss of the connector cover 140.

In the above-described exemplary configuration, the side cover 142 can have the hinge coupling portion HS on top. In this case, the bottom of the side cover 142 can rotatably move up to open the open side surface OS of the connector accommodating portion R. In the above-described exemplary configuration, the side cover 142 can be configured to protect the outer side of the connection member connected to the main connector 131. It will be described in more detail with reference to FIGS. 11 and 12.

Figure 11:
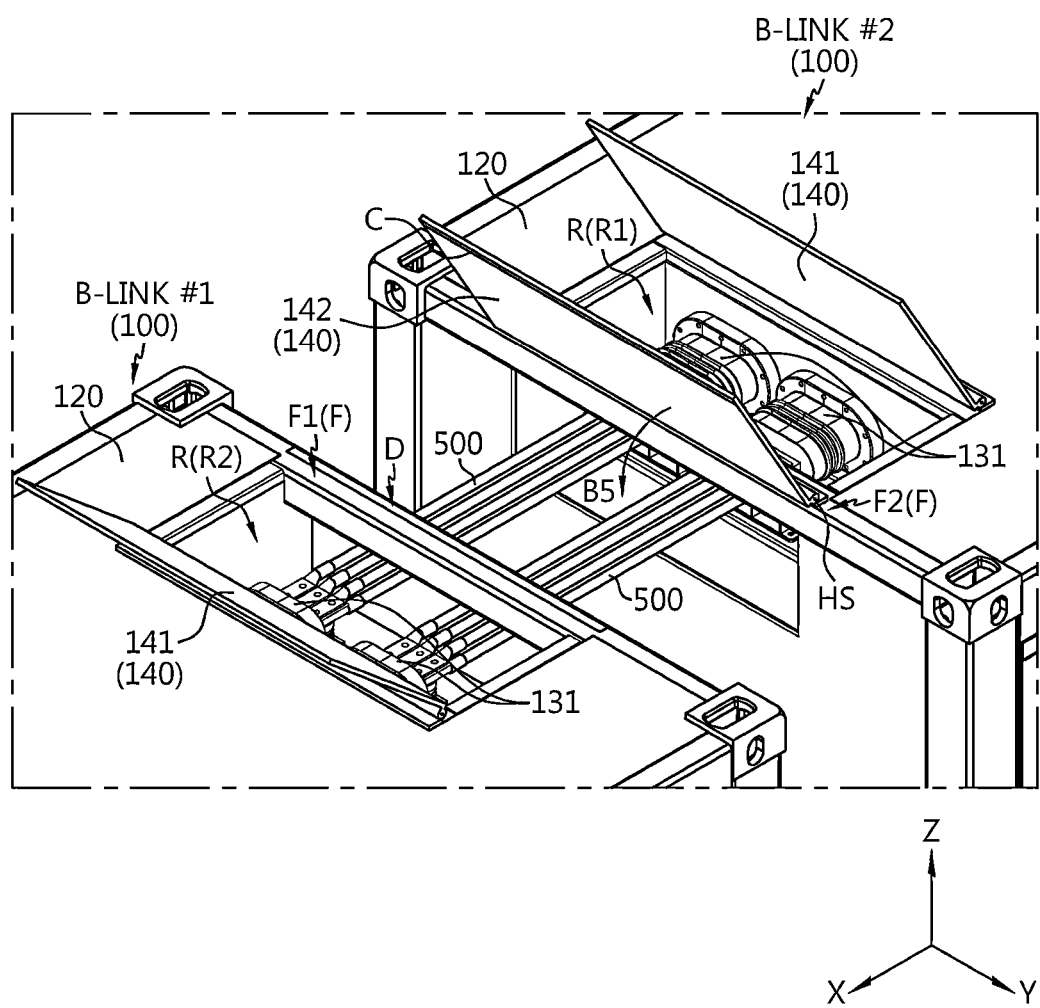
FIGS. 11 and 12 are diagrams schematically showing a connection configuration of a battery container included in a battery system according to another aspect of the present disclosure.
Figure 12:
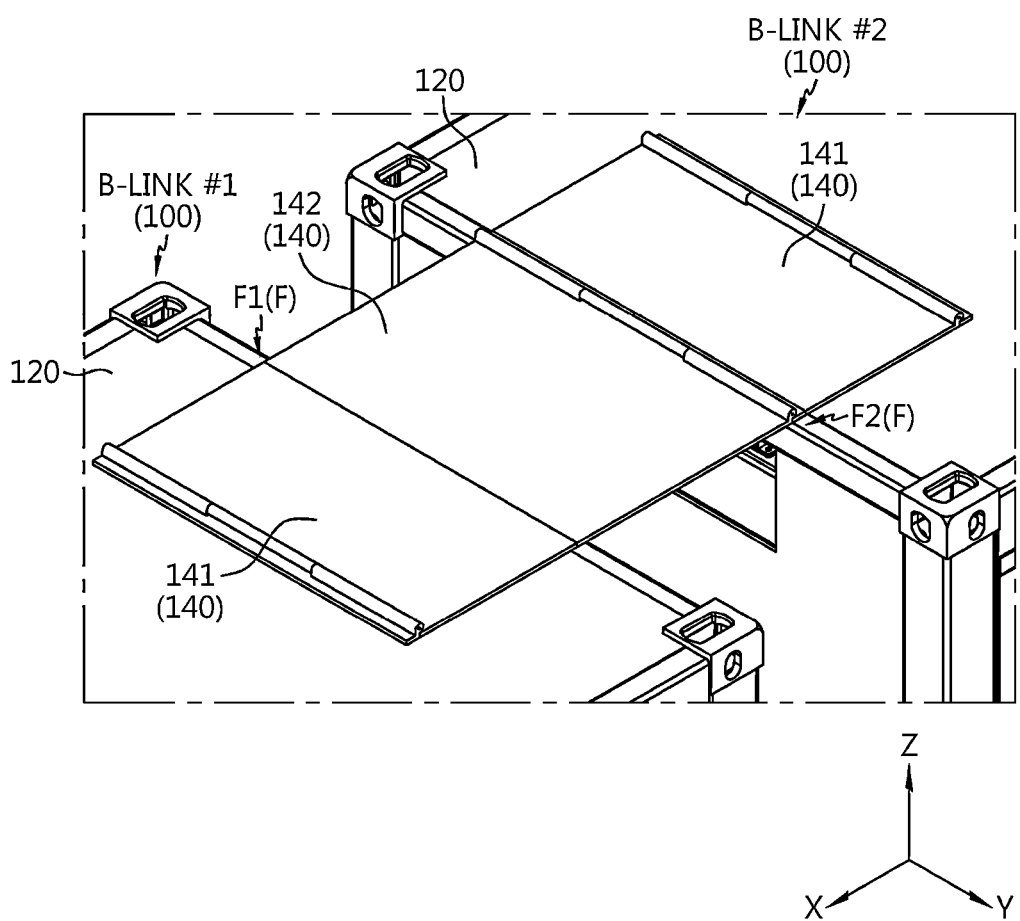

FIGS. 11 and 12 are diagrams schematically showing the connection configuration of the battery container 100 included in the battery system according to another aspect of the present disclosure.

FIGS. 11 and 12 show the right part of the first container B-LINK #1 and the left part of the second container B-LINK #2. In this case, the left part of the first container B-LINK #1, not shown in the drawing, can have the same configuration as the left part of the second container B-LINK #2 shown in the drawing. In addition, the right part of the second container B-LINK #2, not shown in the drawing, can have the same configuration as the right part of the first container B-LINK #1 shown in the drawing. That is, the first container B-LINK #1 and the second container B-LINK #2 can have the same configuration as the battery container 100 according to an aspect of the present disclosure.

First, referring to FIG. 11, the main connector 131 on the right side of the first container B-LINK #1 and the main connector 131 on the left side of the second container B-LINK #2 can be connected to each other through the link busbar 500. In this instance, in the case of the connector accommodating portion R on the left side of the second container B-LINK #2, i.e., the first accommodating portion R1, the upper cover 141 and the side cover 142 can be configured to hinge-rotate as described in the aspect of FIG. 10. Therefore, when the top cover 141 and the side cover 142 are in open state, the worker can connect the link busbar 500 to the main connector 131 of the first container B-LINK #1 and the main connector 131 of the second container B-LINK #2.

And, when the connection operation is completed, as shown in FIG. 12, the upper cover 141 of the first container B-LINK #1 and the upper cover 141 of the second container B-LINK #2 can be closed to close the top of the connector accommodating portion R of each container.

Therefore, after the battery container 100 is installed, it is possible to prevent external foreign matter from entering the top open portion OT of the connector accommodating portion R, and prevent the exposure of the electrical connection part such as the main connector 131, thereby preventing an electric shock accident.

Moreover, as shown in FIGS. 11 and 12, the hinge coupling portion HS of the side cover 142 of the second container B-LINK #2 can be disposed on the upper surface of the coupling reinforcement portion F. In this case, when the side cover 142 of the second container B-LINK #2 is seated on the coupling reinforcement portion F of the first container B-LINK #1, the side cover 142 can be maintained in the horizontal direction approximately parallel to the ground. Accordingly, it is possible to prevent rainwater from going toward the main connector 131 disposed on the left or right side.

In addition, in the above-described exemplary configuration, the connector cover 140 of at least one of the two battery containers 100 connected to each other can be configured to protrude outward in the horizontal direction.

For example, after the connection operation of the link busbar 500 is completed, the side cover 142 of the second container B-LINK #2 can be configured to protrude toward the first container B-LINK #1 in the horizontal direction by the rotational movement as indicated by the arrow B5. In this instance, the side cover 142 of the second container B-LINK #2 can be configured to cover a space between the second container B-LINK #2 and the first container B-LINK #1. Moreover, the side cover 142 of the second container B-LINK #2 is configured to cover the space between the second container B-LINK #2 and the first container B-LINK #1 from the top.

According to the above-described exemplary configuration, the top of the link busbar 500 disposed in the space between the second container B-LINK #2 and the first container B-LINK #1 can be covered. Accordingly, it is possible to improve the protection effect for the link busbar 500 or the main connector 131. For example, it is possible to prevent snow, rain, dust or other foreign matter from entering the link busbar 500 or the main connector 131 from the top of the link busbar 500.

In the above-described exemplary configuration, the connector cover 140 configured to protrude outward in the horizontal direction can be configured to be seated on other battery container 100. For example, as shown in FIG. 12, one end of the side cover 142 of the second container B-LINK #2 can be hinged to the coupling reinforcement portion F of the second container B-LINK #2, i.e., the second reinforcement portion F2, and the other end can be seated on the coupling reinforcement portion F of the first container B-LINK #1, i.e., the first reinforcement portion F1.

In this instance, a seating portion can be formed in the first reinforcement portion F1 of the first container B-LINK #1 as indicated by D in FIG. 11, on which the side cover 142 of the second container B-LINK #2 is seated. In particular, the seating portion D can be formed in the shape of a downward concave groove in the coupling reinforcement portion F. When the link busbar 500 is connected between the main connectors 131 of the two battery containers 100, the end of the side cover 142 can be seated on the seating portion D. In addition, the seating portion D can be formed in a variety of different fastening shapes such as a protrusion or a hook.

According to the above-described exemplary configuration of the present disclosure, it is possible to stably couple the side cover 142 to the other container, and guide the assembly position. Accordingly, it is possible to improve the assembly between the battery containers 100. Also, in this case, it is possible to further protect the link busbar 500 or the main connector 131 by the side cover 142.

In addition, the side cover 142 can be equipped with a sealing member, as indicated by C in FIG. 11, at an end seated on the seating portion D. The sealing member C can be made of an elastic material such as rubber, silicone, or polyurethane. In this case, when the side cover 142 is seated on the seating portion D, it is possible to prevent impacts applied to the side cover 142 or the coupling reinforcement portion F of the container housing 120. Thus, it is possible to prevent damage or breakage of the side cover 142 or the joint reinforcement portion F. In addition, in this case, it is possible to improve the sealability between the side cover 142 and the coupling reinforcement portion F, thereby further improving the infiltration prevention of foreign matter such as water or dust.

Meanwhile, although the aspect of FIG. 10 shows the side cover 142 configured to open the side open portion OS of the connector accommodating portion R by the rotational movement of the bottom of the side cover 142 in the upward direction, the side cover 142 can be configured to open the side open portion OS of the connector accommodating portion R by the rotational movement of the top of the side cover 142 in the downward direction with the hinge coupling portion being disposed on the bottom. For example, in the exemplary configuration of FIGS. 11 and 12, the side cover 142 of the connector accommodating portion R on the right side of the first container B-LINK #1 can open the side open portion of the connector accommodating portion R by the rotational movement of the top in the downward direction with the bottom being hinge-coupled. In this case, the two side covers 142 facing each other, i.e., the side cover 142 of the first container B-LINK #1 and the side cover 142 of the second container B-LINK #2, can be configured to be open in opposite directions.

According to the above-described exemplary configuration, when the side open portion of the connector accommodating portion R is open, it is possible to avoid mutual interferences between the side covers 142. For example, the left cover 142 covering the left part of the first accommodating portion R1 of the second container B-LINK #2 can be kept in open state when disposed on the link busbar 500 as shown in FIGS. 11 and 12. And, the right cover 142 covering the right part of the second accommodating portion R2 of the first container B-LINK #1 can open the right part of the second accommodating portion R2 when coming into contact with the right outer wall of the first container B-LINK #1 by the rotational movement in the downward direction.

According to the above-described exemplary configuration, when the transportation or installation of the battery container 100 is completed, it is possible to prevent the infiltration of external foreign matter into the electrical connection configuration such as the main connector 131 or the link busbar 500, and prevent an electric shock accident. In addition, it is possible to easily perform the connection operation between the main connector 131 and the link busbar 500 during the installation of the battery container 100.

Figure 13:
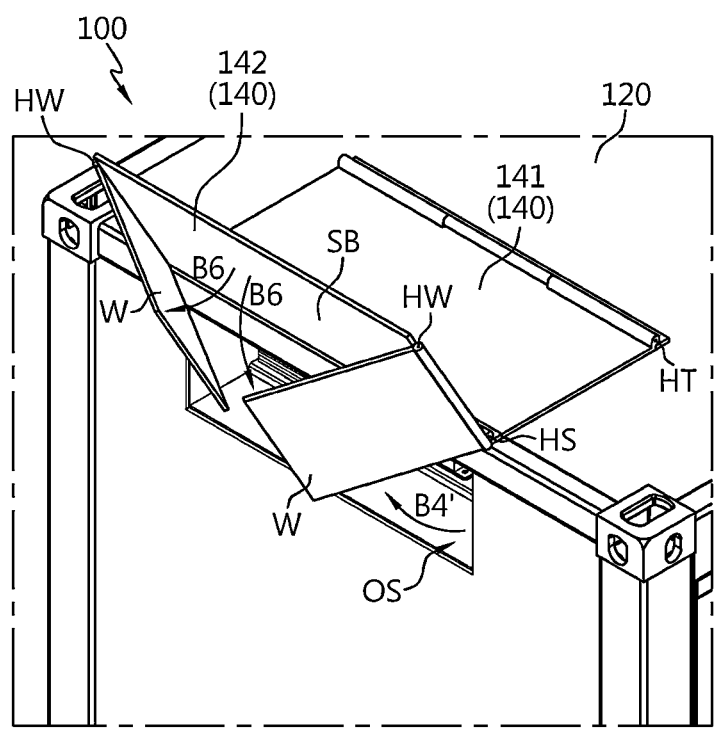
FIG. 13 is a diagram schematically illustrating some components of a battery container included in a battery system according to another aspect of the present disclosure.
Figure 14:
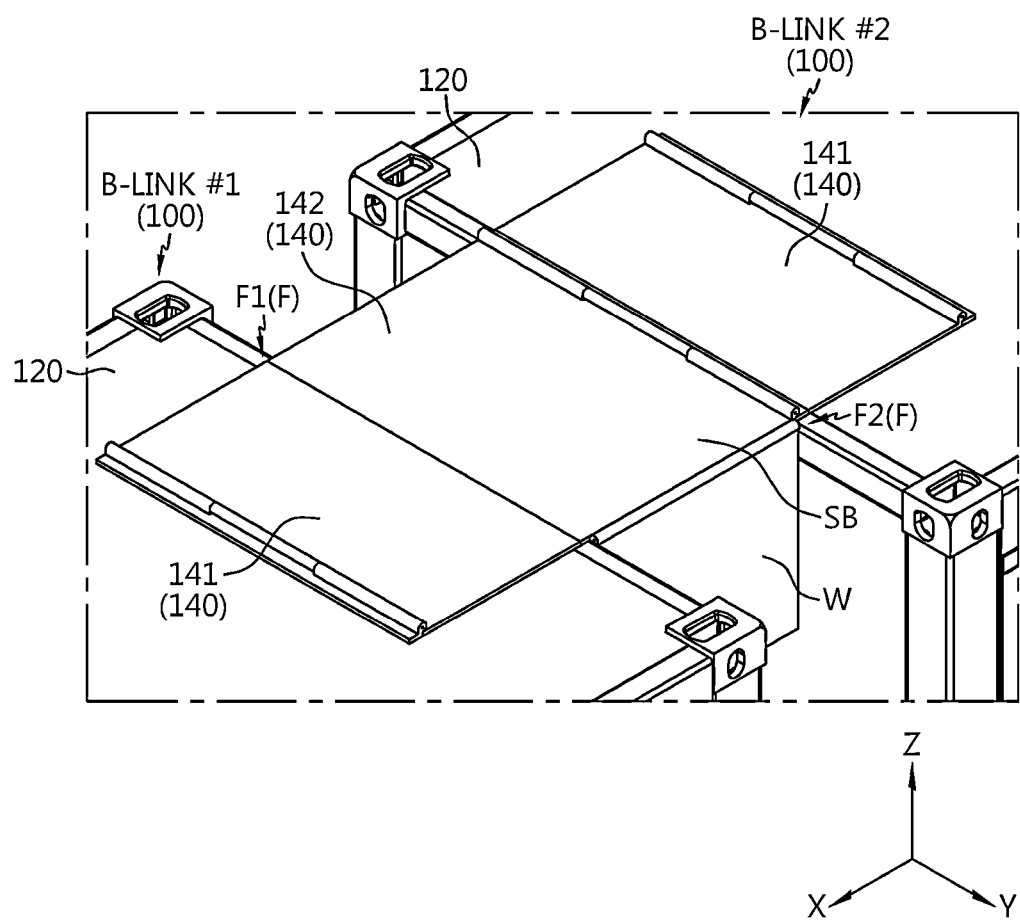
FIG. 14 is a diagram schematically illustrating a connection configuration of parts of a battery system including the battery container of FIG. 13.

FIG. 13 is a diagram schematically illustrating some components of the battery container 100 included in the battery system according to another aspect of the present disclosure. FIG. 14 is a diagram schematically illustrating the connection configuration of parts of the battery system including the battery container 100 of FIG. 13.

First, referring to FIG. 13, the side cover 142 can be hinge-coupled to the side open portion OS of the container housing 120, and the side cover 142 can include a body portion as indicated by SB and a wing portion as indicated by W. The wing portion W can be rotatably coupled to the plate-shaped body portion SB covering the side open portion OS. In particular, the wing portion W can be hinge-coupled to the end of the body portion SB, as indicated by HW. For example, the wing portion W can hinge-pivot as indicated by the arrow B6 in FIG. 13.

The wing portion W can be disposed at two ends of the side cover 142. For example, the wing portion W can be disposed at the front and rear ends of the body portion SB, respectively. Moreover, when the body portion SB is disposed on the upper side of the link busbar 500 in the space between the two battery containers 100, the wing portion W can be disposed on the front side of the link busbar 500 and/or the rear side of the link busbar 500. More specifically, referring to FIG. 14, when the body portion SB of the side cover 142 included in the second container B-LINK #2 is seated and coupled on the container housing 120 of the first container B-LINK #1, the wing portion W of the side cover 142 can be disposed on the front side and the rear side of the link busbar 500.

According to the above-described exemplary configuration of the present disclosure, it is possible to further improve the protection effect of the link busbar 500 by the side cover 142. In particular, in the case of the above-described exemplary configuration, the upper side of the link busbar 500 can be protected by the body portion SB of the side cover 142, and the front side and the rear side can be covered by the wing portion W of the side cover 142.

In particular, as shown in FIG. 13, when the side cover 142 is not open, the wing portion W can be disposed at the inner position than the body portion SB. In this case, when the cover 142 is open as indicated by the arrow B4', the wing portion W can automatically rotate from the body portion SB by gravity as indicated by the arrow B6. In this case, there is no need for the operation or driving force for unfolding the wing portion W from the body portion SB. Accordingly, it is possible to build the battery system faster and more easily with economical efficiency.

Figure 15:
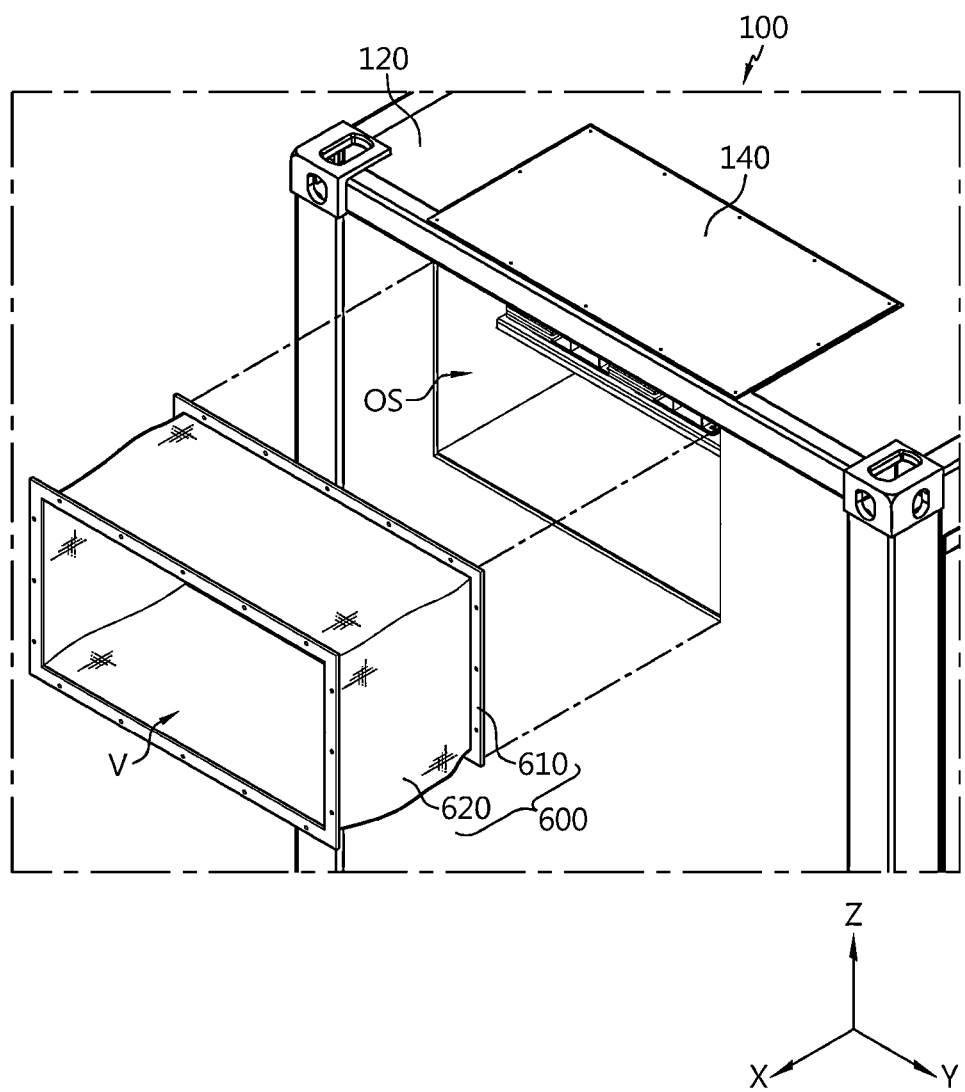
FIG. 15 is an exploded perspective view schematically illustrating some components of a battery system according to another aspect of the present disclosure.
Figure 16:
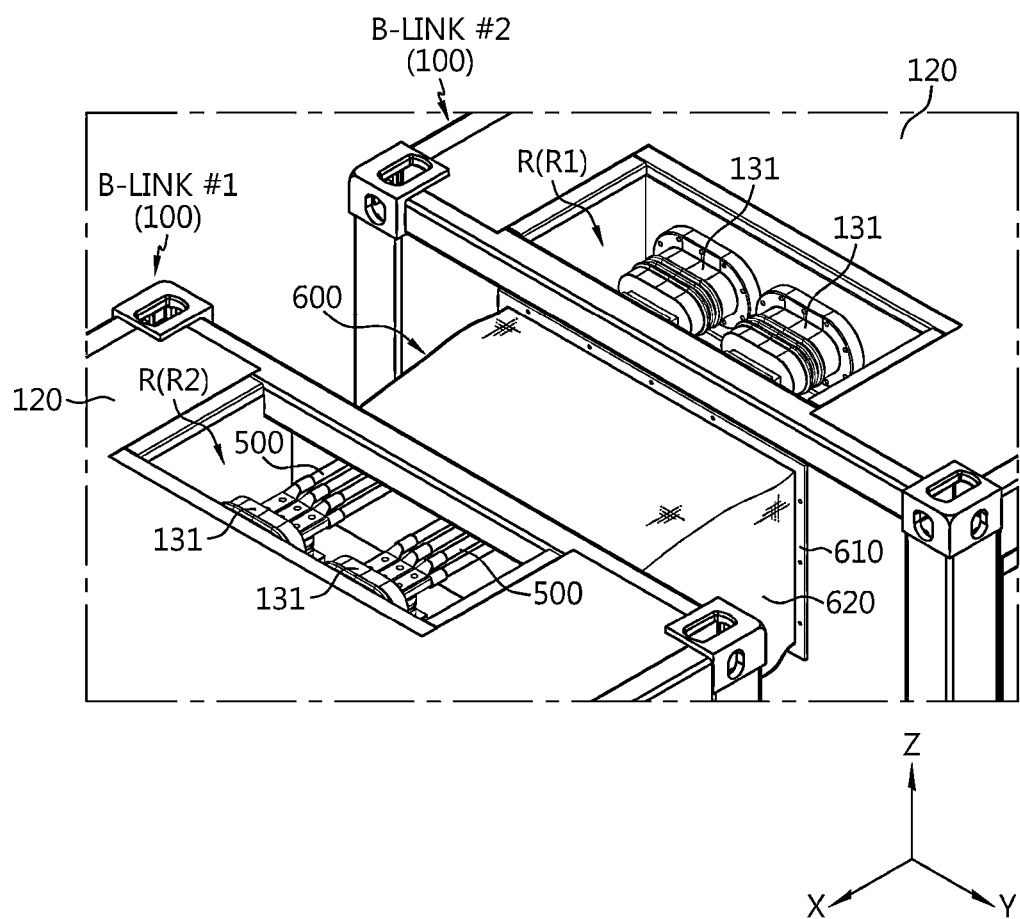
FIG. 16 is a perspective view showing some components of a battery system to which the exemplary configuration of FIG. 15 is applied.

FIG. 15 is an exploded perspective view schematically illustrating some components of the battery system according to another aspect of the present disclosure. FIG. 16 is a perspective view showing some components of the battery system to which the exemplary configuration of FIG. 15 is applied.

Referring to FIGS. 15 and 16, the battery system according to the present disclosure can further include a link cover 600.

The link cover 600 can be configured to be coupled to the outer wall of the container housing 120, in particular, the side of the connector accommodating portion R. For example, as shown in FIG. 15, the link cover 600 can be coupled to the connector accommodating portion R on the left side of the battery container 100. Furthermore, the link cover 600 can have an empty space, i.e., a hollow in the center as indicated by V. The link cover 600 can be attached to the container housing 120 such that the hollow V communicates with the side open portion OS of the connector accommodating portion R.

The link cover 600 can be configured to attach and detach to/from the outer wall of the container housing 120. In particular, during the storage or transportation of the battery container 100, the side cover 142 can be attached to the side open portion OS of the connector accommodating portion R. And, to connect the battery container 100 to other battery container 100, the link cover 600 can be coupled to the sidewall of the container housing 120 so that the side cover 142 opens the side open portion OS and the hollow V communicates with the side open portion OS.

The link cover 600 can be configured to be, at two ends, coupled to the container housing 120 of the battery container 100. For example, in the exemplary configuration of FIG. 15, the two ends of the link cover 600 can be coupled to the right wall of the container housing 120 of the first container B-LINK #1 and the left wall of the container housing 120 of the second container B-LINK #2. Here, the ends of the link cover 600 can be coupled to the container housing 120 by various fastening methods such as bolt coupling and hook coupling.

In addition, the link cover 600 can be coupled around the connector accommodating portion R in the container housing 120, in particular, the side open portion OS of the connector accommodating portion R. For example, the link cover 600 can have an end formed in the shape of an approximately square ring, and can be coupled to the upper, lower, front and rear sides of the side open portion OS of the connector accommodating portion R.

In addition, the link cover 600 can be configured to surround the link busbar 500 connected to the main connector 131 when coupled to the side of the connector accommodating portion R. For example, as shown in FIG. 15, when the right end of the link cover 600 is coupled to the side open portion OS of the left connector accommodating portion R of the second container B-LINK #2, the left end of the link cover 600 can be coupled to the side open portion of the right connector accommodating portion R of the first container B-LINK #1 as shown in FIG. 16. In this instance, the link busbar 500 can be connected between the main connector 131 disposed in the left connector accommodating portion R of the second container B-LINK #2 and the main connector 131 disposed in the right connector accommodating portion R of the first container B-LINK #1. In particular, the link busbar 500 can be inserted into the hollow V of the link cover 600.

The link cover 600 can be configured to cover a direction perpendicular to the extension direction of the link busbar 500. For example, the link busbar 500 can extend in the left-right direction between two battery containers 100 arranged in the left-right direction, and when the link cover 600 is, at two ends, coupled to the two battery containers 100, the link cover 600 can be configured to surround the upper, lower, front and rear sides of the link busbar 500.

The link cover 600 can be made of a flexible material or shape. In particular, as shown in FIGS. 15 and 16, the link cover 600 can include two mounting members 610 each attached to the adjacent container housing 120 and a cover member 620 between the two mounting members 610.

Here, the mounting member 610 can be formed in an approximately ring shape and attached around the side open portion of the connector accommodating portion R. Also, the cover member 620 can be made of a flexible material to cover the upper, lower, front and rear sides of the link busbar 500. In particular, the cover member 620 can be configured to have flexibility in the horizontal and vertical directions. In addition, the cover member 620 can be configured to form a hollow by bending and rolling one sheet. Also, two ends of the bent sheet can meet each other and be coupled to each other. That is, the pipe-shaped cover member 620 can be formed by bending a flexible sheet member and coupling two separated ends to each other. Here, the coupling portion of the sheet member, in particular, the overlap portion, can be disposed below the cover member 620. Moreover, the cover member 620 can be configured in the form of a fabric. That is, the cover member 620 can have a sheet shape woven using fibers.

According to the above-described exemplary configuration of the present disclosure, it is possible to prevent the exposure of the link busbar 500 and the main connector 131 in the space between the two battery containers 100 more reliably. Thus, it is possible to protect the electrical connection configuration between the battery containers 100 more stably. In particular, since the system such as ESS is often placed outdoors, according to the above-described exemplary configuration, it is possible to safely protect the electrical connection configuration of the battery container 100 from many external factors. For example, it is possible to safely protect the link busbar 500 of the present disclosure from many external climatic and animal factors such as water, wind, heat, dust, insects and birds. Furthermore, according to the above-described exemplary configuration, it is possible to improve the infiltration suppression performance for materials falling down to the link busbar 500 from the top of the link busbar 500 and materials approaching from the side or bottom.

In addition, according to above-described exemplary configuration, it is possible to respond to the tolerance with respect to the size of the space between the two battery containers 100. That is, the link cover 600 can be installed between the two battery containers 100, and the space between the two battery containers 100 can have various sizes. Moreover, even if the seating position of each battery container 100 is set in the process of constructing the battery system, the position of the battery container 100 can change according to circumstances during the installation process. In this instance, the space between the battery containers 100 can change in size. According to the above-described exemplary configuration, since the link cover 600 has flexibility, the link cover 600 can deform into an appropriate shape and can be mounted in the battery container 100. Therefore, it is easy to install the link busbar 500, and it is possible to stably perform the protection function. In addition, according to the above-described exemplary configuration, it is possible to easily manufacture the link cover 600 that protects the link busbar 500.

Meanwhile, the plurality of battery racks 110 can be included in the container housing 120. That is, the battery container 100 can include the plurality of battery racks 110. And, in one battery container 100, the plurality of battery racks 110 can be connected in parallel to the first power line 130. For example, in the exemplary configuration of FIG. 2, in each of the plurality of battery racks 110 included in the first container B-LINK #1, the positive terminal can be connected to the first positive line 130+, and the negative terminal can be connected to the first negative line 130−.

In addition, the battery system according to the present disclosure can include the plurality of battery containers 100, and the battery racks 110 included in the plurality of battery containers 100 can be connected in parallel. For example, referring to the exemplary configuration of FIG. 2, the plurality of battery racks 110 included in the first container B-LINK #1 to the third container B-LINK #3 can be connected in parallel to each first power line 130 extended in a straight line.

In the above-described configuration, even if a problem occurs in the state or connection of the specific battery rack 110 included in some of the plurality of battery containers 100, the other batteries racks 110 than the corresponding battery rack 110 can operate normally. Therefore, it is possible to prevent the entire battery system from stopping due to the problem of some battery racks 110.

As shown in FIG. 2, the control cabinet 200 can be connected to the plurality of battery containers 100 and an AC line 720. That is, the battery system according to the present disclosure can further include the AC line 720 separately from the DC line. Here, the DC line can be the link line 710 described above in the aspect of FIG. 2. That is, the link line 710 between the control cabinet 200 and the battery container 100 can be provided so that charge/discharge power flows in DC form. In addition, the AC line 720 can be connected between the battery container 100 and the control cabinet 200 separately from the link line 710 so that AC power flows.

Moreover, unlike the link line 710, the AC line 720 can be connected to each of the plurality of battery containers 100. For example, referring to the exemplary configuration of FIG. 2, in the battery system including one control cabinet 200 and three battery containers 100, the link line 710 can be configured to connect only the control cabinet 200 and one battery container 100. More specifically, in the exemplary configuration of FIG. 2, the link line 710 is connected between the control cabinet 200 and the first container B-LINK #1, and the link line 710 is not connected between the control cabinet 200 and the second container B-LINK #2 or between the control cabinet 200 and the third container B-LINK #3. In contrast, the AC line 720 can be connected to the control cabinet 200 and each of the three battery containers 100. That is, each AC line 720 can be directly connected between the control cabinet 200 and the first container B-LINK #1, between the control cabinet 200 and the second container B-LINK #2, and between the control cabinet 200 and the third container B-LINK #3.

In the above-described exemplary configuration, the control cabinet 200 can be connected to each of the plurality of battery containers 100 to individually supply AC power. In particular, the control cabinet 200 can be supplied with three-phase AC power, and can supply AC power to the three battery containers 100 from the supplied power. The AC power supplied from the control cabinet 200 can be supplied to various components included in the battery container 100, such as a fan for cooling or air conditioning, HVAC, a CAN repeater, or various sensors.

Also, the control cabinet 200 can supply communication signals through the AC line 720. For example, the control cabinet 200 can transmit and receive control signals or sensing signals to/from each of the plurality of battery containers 100 through the AC line 720. Moreover, the control cabinet 200 and/or the battery container 100 can transmit and receive signals through Power Line Communication (PLC). Therefore, in the case of the above-described aspect, it is possible to easily implement PLC control for the battery system.

The control cabinet 200 can include an uninterruptible power supply (UPS). The control cabinet 200 can supply the power for operating the components to each battery container 100 by the UPS. In particular, the control cabinet 200 can include a UPS line and a non-UPS line as the AC line 720 connected to each battery container 100. For example, in the exemplary configuration of FIG. 2, two AC lines 720 can be connected between the control cabinet 200 and each battery container 100, and one of them can be the UPS line and the other can be the non-UPS line.

In addition, the battery container 100 can be configured to supply the operating power from the first power line 130 to various internal components, for example, the control unit such as the BMS or a cooling unit such as a fan. In this case, the voltage of the battery container 100 can be reduced through a voltage regulator or the like, and then supplied to the corresponding component.

Figure 17:
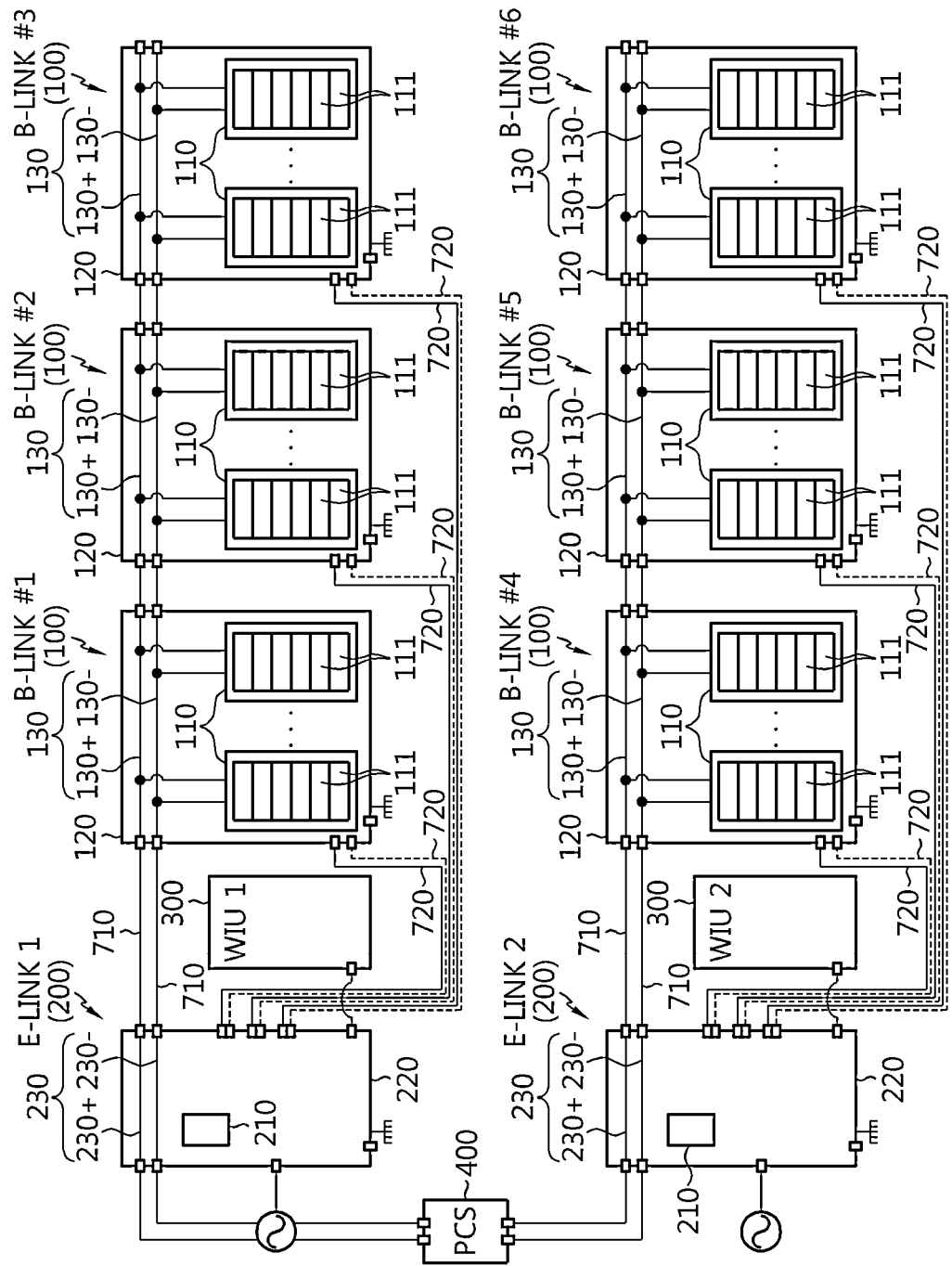
FIGS. 17 and 18 are diagrams schematically showing the architecture of a battery system according to another aspect of the present disclosure.
Figure 18:
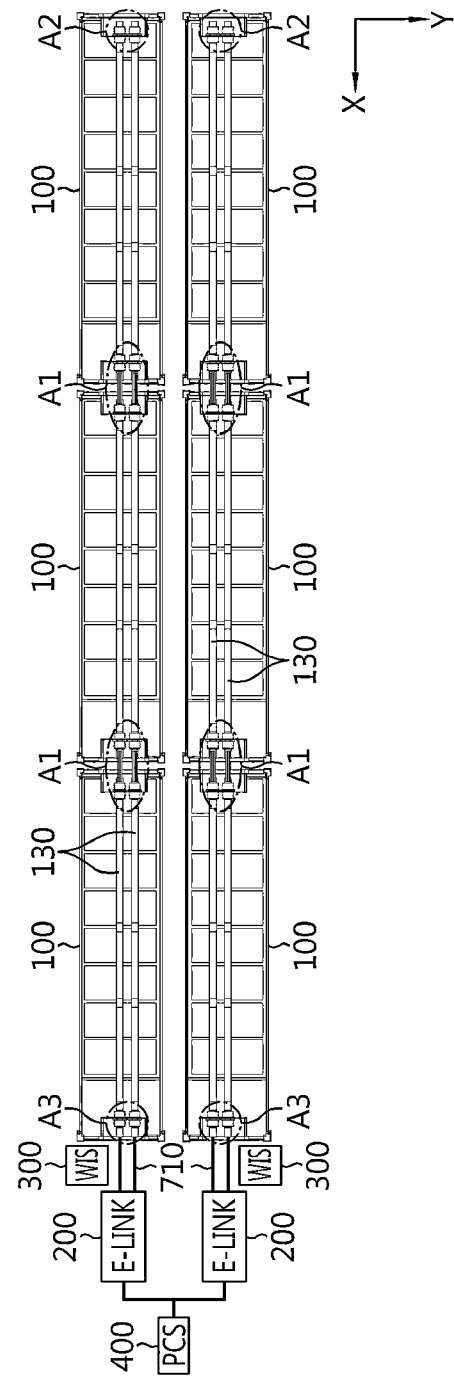

FIGS. 17 and 18 are diagrams schematically showing the architecture of the battery system according to another aspect of the present disclosure.

Referring to FIGS. 17 and 18, the battery system according to the present disclosure can include two or more control cabinets 200. The two or more control cabinets 200 can be connected to one PCS 400. Also, the plurality of battery containers 100 can be connected to each control cabinet 200.

Describing in more detail, in the exemplary configuration of FIGS. 17 and 18, the battery system can include six battery containers 100 (B-LINK #1~6), two control cabinets 200 (E-LINK #1~2), and one PCS 400. Here, three battery containers 100 and one control cabinet 200 can constitute one link group. Also, two link groups can be included in the battery system and can be connected to one PCS 400 in common. The charge/discharge power path, in particular, DC path of three battery containers 100 in each link group can be connected to each other through each main connector 131 disposed at the left and right ends. And, as described above, the link busbar 500 can be connected between the battery containers 100 such as the portion indicated by A1 to form a DC link between the battery containers 100. And, for the connection of the link busbar 500, in the portion indicated by A1, the side cover 142 can open the side open portion OS of the connector accommodating portion R, and the link cover 600 can be installed.

Meanwhile, in each of the two link groups, in the portion not connected to other containers among the battery containers 100 disposed on the outer periphery, the side cover 142 can close the side open portion OS of the connector accommodating portion R. For example, in the aspect of FIG. 18, as in the portion indicated by A2, in the right connector accommodating portion R of the battery container 100 on the rightmost side, the side open portion OS can be closed by the side cover 142.

In the battery system according to the present disclosure, the battery container 100 can be connected to the control cabinet 200 through the link line 710. The link line 710 connected to the control cabinet 200 can be connected to the main connector 131 of the battery container 100. In this instance, the battery container 100 can further include an additional component for connection to the link line 710. It will be described in more detail with reference to FIGS. 19 and 20.

Figure 19:
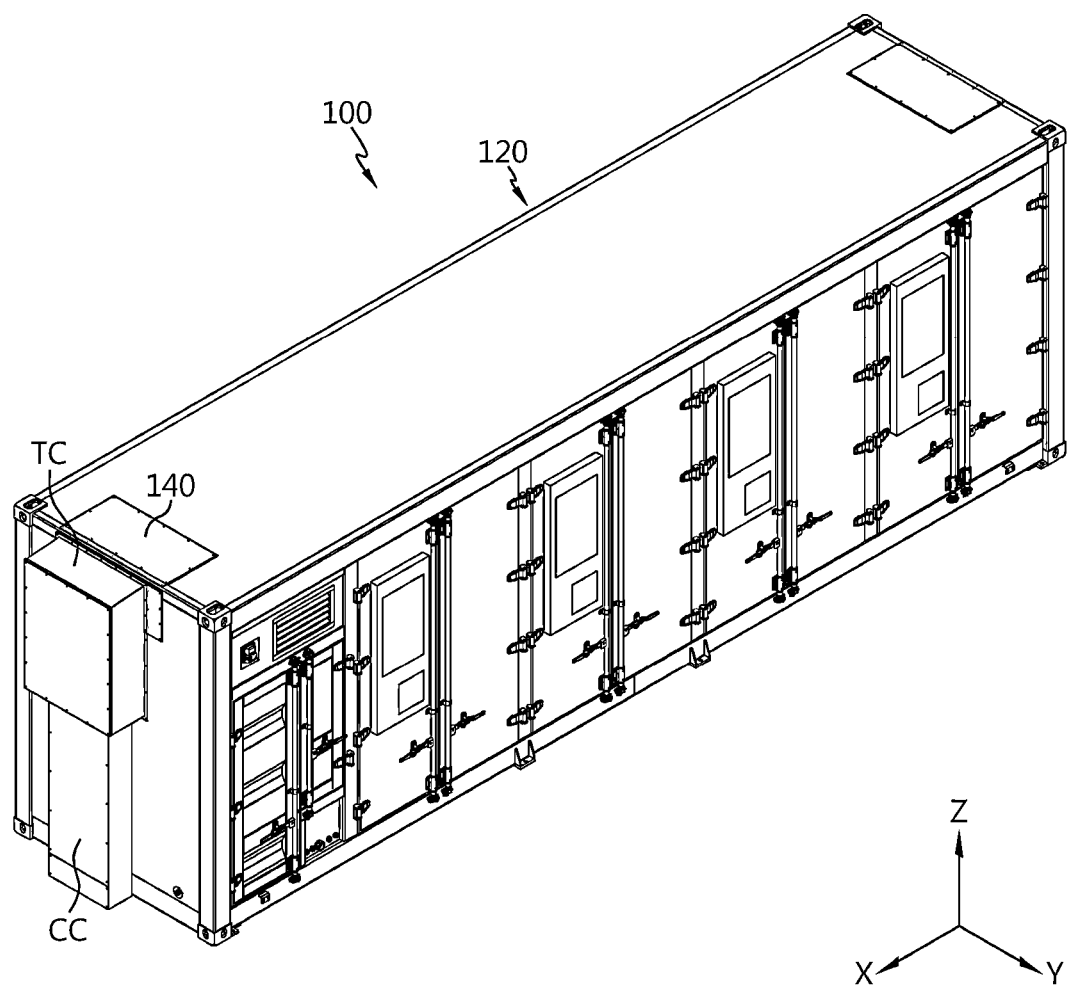
FIG. 19 is a perspective view schematically illustrating the configuration of a battery container included in a battery system according to another aspect of the present disclosure.
Figure 20:
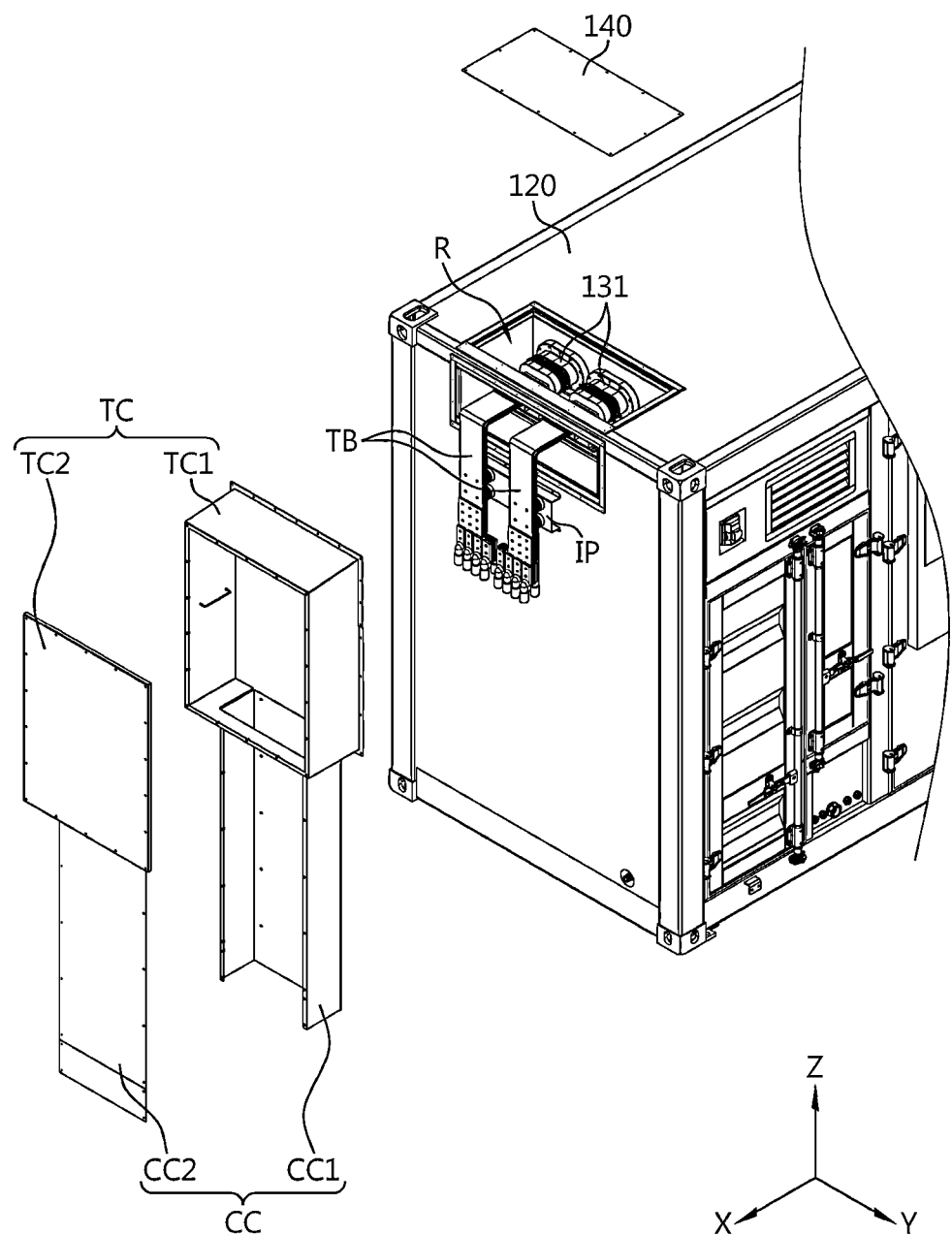
FIG. 20 is a partial exploded perspective view of FIG. 19.

FIG. 19 is a perspective view schematically illustrating the configuration of the battery container 100 included in the battery system according to another aspect of the present disclosure. FIG. 20 is a partial exploded perspective view of FIG. 19.

For example, the battery container 100 shown in FIG. 19 can be the battery container 100 on the leftmost side, directly connected to the control cabinet 200 in each link group as indicated by A3 among the plurality of battery containers 100 shown in FIG. 18.

Referring to FIGS. 19 and 20, the battery container 100 can include a terminal busbar TB, an insulation panel IP, and/or a terminal cover TC.

The terminal busbar TB can be connected to the side of the main connector 131 directly connected to the control cabinet 200. For example, in the configurations of FIGS. 19 and 20, the terminal busbar TB can be connected to the left main connector 131 of the battery container 100 positioned at the leftmost side in each link group. The other end of the terminal busbar TB can be connected to the link line 710.

The terminal busbar TB can be made of an electrically conductive material. Also, the terminal busbar TB can be formed in a plate shape. For example, the terminal busbar TB can be formed in the form of a metal plate. In this case, the terminal busbar TB can be stably mounted on the outer wall of the container housing 120. In addition, the terminal busbar TB can include two terminal busbars with different polarities, i.e., a positive terminal busbar and a negative terminal busbar, to transmit the power.

Moreover, the terminal busbar TB can extend from the main connector 131 disposed in the connector accommodating portion R to the outside of the connector accommodating portion R and bend along the outer wall of the container housing 120. In particular, when the main connector 131 is disposed on the container housing 120, the terminal busbar TB can extend from the main connector 131 to the left in the horizontal direction and bend downward. In this case, it is possible to suppress the protrusion of the terminal busbar TB, and perform the connection operation between the terminal busbar TB and the link line 710 more easily. In addition, in this case, since the end of the terminal busbar TB faces downward, it is possible to form an underground configuration of the link line 710 connected thereto more easily.

The insulation panel IP can electrically insulate between the terminal busbar TB and the container housing 120. To this end, the insulation panel IP can include an electrically insulating material such as rubber, silicon, or plastic. Furthermore, the insulation panel IP can be interposed between the terminal busbar TB and the outer surface of the container housing 120 to make the terminal busbar TB spaced a predetermined distance apart from the outer surface of the container housing 120. In addition, the insulating panel IP can be made of an elastic material to prevent shock or vibration transfer between the terminal busbar TB and the container housing 120.

The terminal cover TC can be configured to protect the terminal busbar TB. To this end, the terminal cover TC can be configured to cover the outer side of the terminal busbar TB. For example, the terminal cover TC can include a shroud panel as indicated by TC1 and a shroud cover as indicated by TC2. Here, the shroud panel TC1 can be formed in an approximately square ring shape, and can be configured to surround the sides of the terminal busbar TB, such as the upper, lower, front and rear sides. The shroud cover TC2 can be formed in an approximately plate shape, and can be configured to cover the open side of the shroud panel TC1. Accordingly, the shroud cover TC2 can cover the left part of the terminal busbar.

According to the above-described exemplary configuration, it is possible to stably protect the terminal busbar from external physical and chemical factors. In addition, in the above-described exemplary configuration, the shroud cover TC2 can be separated from the shroud panel TC1. In this case, it is possible to easily connect, separate or repair the terminal busbar TB through the separation of the shroud cover TC2.

In addition, the battery container 100 according to the present disclosure can include a cable cover CC. The cable cover CC can be configured to surround a cable connected to the battery container 100. For example, a plurality of power cables can be connected to the terminal busbar TB to transmit the power. Here, the power cable connected to the terminal busbar TB can be the link line 710 described above or a cable connected to the link line 710. The cable cover CC can be disposed at an end of the terminal cover TC, for example, a lower end, to protect the plurality of power cables connected to the terminal busbar TB. Alternatively, a data cable can be connected to the battery container 100 to transmit and receive various data to/from other external components, such as the control cabinet 200. In this instance, the cable cover CC can be configured to protect the data cable connected to the battery container 100 from the outside.

In particular, the cable cover CC can include a cable tray CC1 and a tray cover CC2. The cable tray CC1 can include a main body portion attached to the outer wall of the container housing 120 and a side wall portion protruding outward from the edge of the main body. For example, the side wall portion can protrude leftward from the front and rear edges of the main body portion. The tray cover CC2 can be coupled to the end of the side wall portion protruding from the main body portion of the cable tray CC1, to form an empty space together with the main body portion and the side wall portion. In particular, the empty space can be hollow. Accordingly, the cable can extend outward from the battery container 100 through the empty space of the cable cover CC. In addition, the cable extended outward can be connected to other external components, such as the control cabinet 200 or other battery container 100.

According to the above-described exemplary configuration, it is possible to minimize the exposure of the cable extended outward from the battery container 100 to protect the cable and prevent damage or breakage of the cable. Furthermore, the cable cover CC can be hollow in the downward direction from the side of the container housing 120, so that the cable received therein can be exposed to the outside toward the lower side. In this case, it is possible to facilitate the installation and management and underground configuration of the cable.

Figure 21:
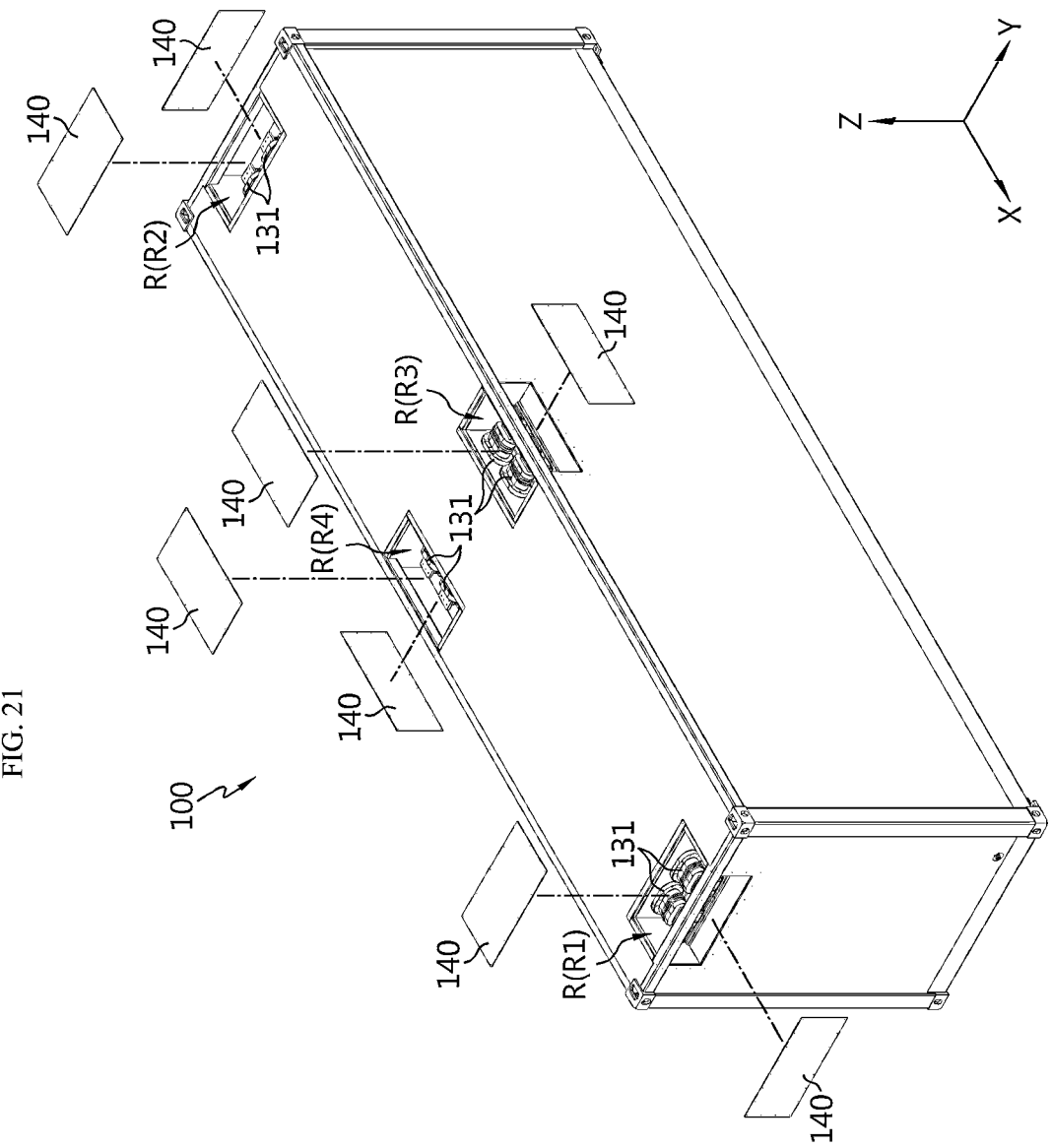
FIG. 21 is a perspective view schematically illustrating the configuration of a battery container included in a battery system according to another aspect of the present disclosure.

FIG. 21 is a perspective view schematically illustrating the configuration of the battery container 100 included in the battery system according to another aspect of the present disclosure.

Referring to FIG. 21, the battery container 100 can have three or more connector accommodating portions R. More specifically, the connector accommodating portion R can be formed on the container housing 120, and can be formed not only on the left and right parts, but also the front and rear parts. In addition, the main connector 131 can be provided in each of the four connector accommodating portions R1 to R4. In addition, the main connectors 131 can be connected to each other through the main busbar 132 to allow the power, in particular, DC power, to flow. In addition, the connector cover 140 can be provided in each of the connector accommodating portions R1~R4 and can be open and closed to expose or cover the main connector 131.

According to the above-describe exemplary configuration, it is possible to easily construct various types of battery systems. For example, two different battery containers 100 can be arranged side by side in the left-right lengthwise direction (X-axis direction) and connected to each other in the form of DC link, as shown in FIGS. 4 and 5. Alternatively, the two different battery containers 100 can be arranged side by side in the front-rear widthwise direction (Y-axis direction) and connected to each other in the form of DC link. Here, when the two battery containers 100 are arranged side by side in the left-right lengthwise direction, the main connectors 131 of the connector accommodating portions R1 and R2 disposed at the left and right ends can be used. Alternatively, when the two battery containers 100 are arranged side by side in the front-rear widthwise direction, the main connectors 131 of the connector accommodating portions R3 and R4 disposed at the front and rear ends can be used. Therefore, it is possible to increase the degree of freedom of the overall design of the battery system or the arrangement position of each component.

Meanwhile, in the above-described exemplary configuration, the top and side of the connector accommodating portion R at which the unused main connector 131 according to the arrangement of the battery container 100 is disposed can be covered by the connector cover 140.

The battery system according to the present disclosure can further include an air conditioning module 160 and/or a venting module 170.

For example, referring to the exemplary configuration of FIG. 3, the container housing 120 of the battery container 100, for example, the door E, can include one or more heating, ventilation, & air conditioning (HVAC) as the air conditioning module 160. The HVAC can allow air to circulate in the container housing 120. The air conditioning module 160 can be configured to prevent direct contact between inside air and outside air. That is, the air conditioning module 160 can be configured to prevent inside air from being discharged to the outside and preventing outside air from being introduced into the inside. Therefore, even if the temperature in the container housing 120 rises, the air conditioning module 160 can absorb only heat from the inside air and discharge it to the outside without directly discharging the inside air to the outside. According to the above-described exemplary configuration, even if a fire or toxic gas is generated inside the battery container 100, it can be discharged to the outside to prevent damage to other devices such as other battery containers 100 or external workers.

Also, the venting module 170 can be configured to discharge gas inside the container housing 120 to the outside. Also, the venting module 170 can introduce the outside air of the container housing 120 into the inside. Accordingly, the venting module 170 can act as a ventilation device. That is, the venting module 170 can exchange or circulate gas between the inside and outside of the container housing 120.

In particular, the venting module 170 can be configured to operate in an abnormal situation, such as when a venting gas is generated or a fire occurs in the specific battery module 111. Moreover, the venting module 170 can be configured to discharge gas to the outside when the gas is generated inside the container housing 120 due to thermal runaway of the battery rack 110. Furthermore, the venting module 170 can be closed in normal condition and change to an open state in abnormal condition such as thermal runaway. In this case, since the venting module 170 performs active venting, the venting module 170 can be referred to as an Active Ventilation System (AVS) or can include the AVS.

In this case, it is possible to prevent a larger problem such as an explosion from occurring due to an increase in internal pressure of the battery container 100. In addition, in this case, the possibility of fire in the battery container 100 can be lowered, or the occurrence of a fire can be delayed, and the scale of a fire can be reduced by rapidly discharging the combustible gas inside the container housing 120 to the outside.

Meanwhile, in the exemplary configuration in which the venting module 170 and the air conditioning module 160 are included in each battery container 100, the venting module 170 may not operate and the air conditioning module 160 can operate in normal condition. In this case, during the cooling process, it is possible to prevent the infiltration of foreign matter or moisture into the container housing 120 through the venting module 170.

According to the above-described exemplary configuration, since the air conditioning module 160 and the venting module 170 are embedded in the battery container 100, transportation and installation of the air conditioning module 160 or the venting module 160 can be achieved only by transporting and installing the battery container 100. Therefore, it is possible to minimize the on-site installation operation for installing the energy storage system and simplify the connection structure.

In the above-described exemplary configuration, the air conditioning module 160 and/or the venting module 170 can operate under the control of the control cabinet 200. Alternatively, the air conditioning module 160 and/or the venting module 170 can be controlled by the control unit included in the battery container 100 such as the rack BMS.

The battery system according to the present disclosure can further include a firefighting cabinet 300 as shown in FIG. 1.

The firefighting cabinet 300 can be configured to supply a fire extinguishing liquid to one of the plurality of battery containers 100. It will be described in more detail with further reference to FIGS. 22 to 24.

Figure 22:
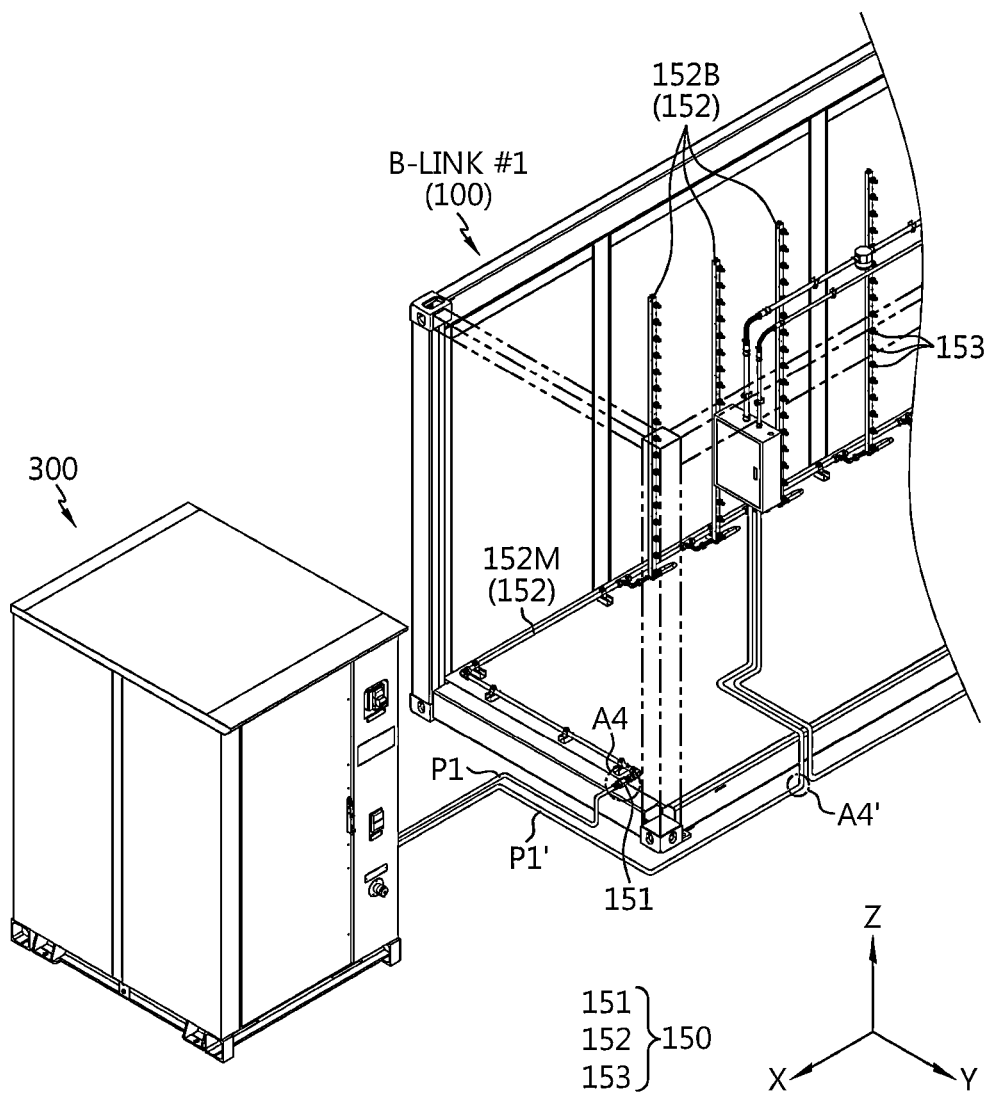
FIG. 22 is a diagram schematically illustrating some components of a battery system according to another aspect of the present disclosure.
Figure 23:
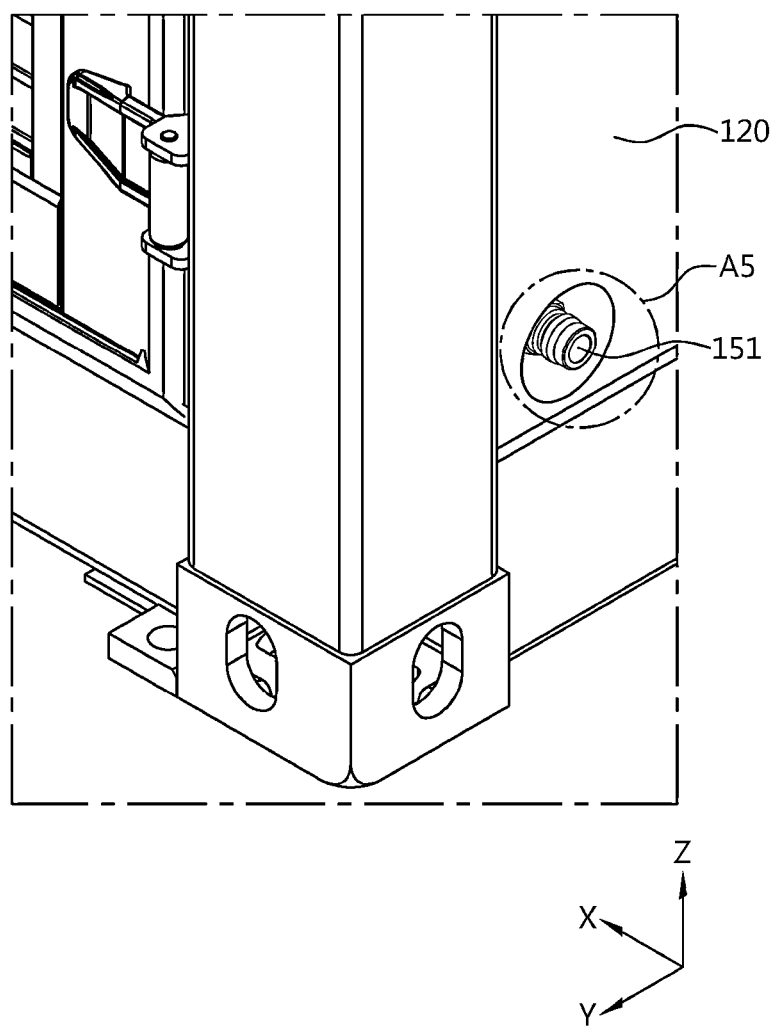
FIG. 23 is a partial enlarged view of a battery container according to another aspect of the present disclosure.
Figure 24:
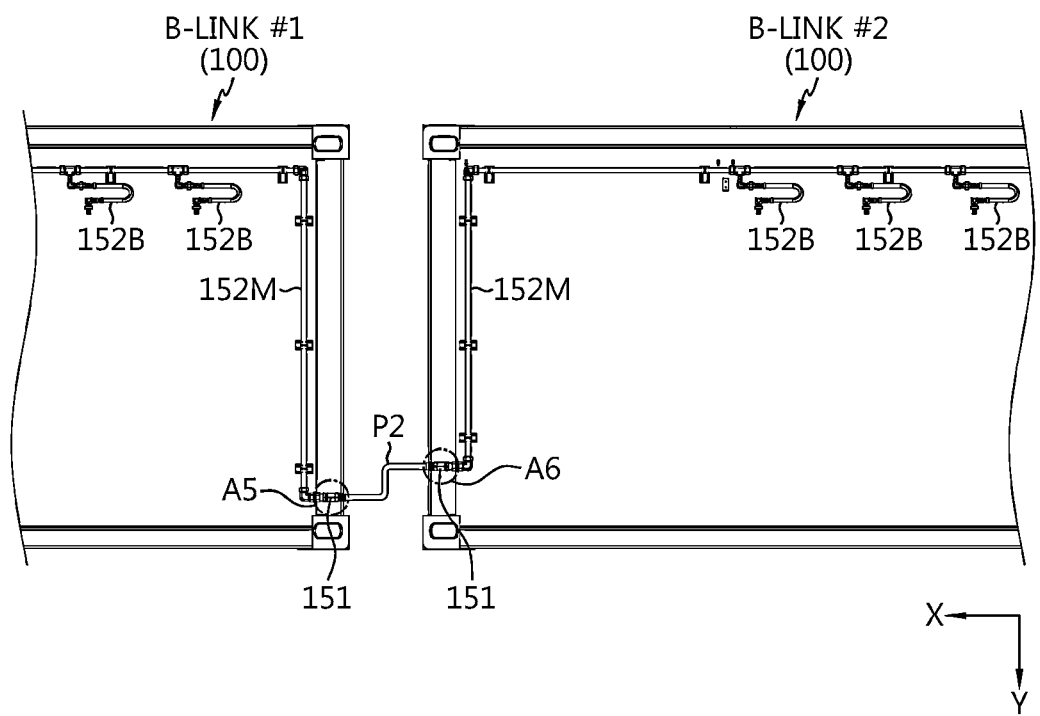
FIG. 24 is a diagram schematically illustrating a connection form of a firefighting module between two battery containers in a battery system according to an aspect of the present disclosure.

FIG. 22 is a diagram schematically illustrating some components of the battery system according to another aspect of the present disclosure. FIG. 23 is a partial enlarged view of the battery container 100 according to another aspect of the present disclosure. In particular, FIG. 23 can be an enlarged view of a bottom right portion of the battery container 100. FIG. 24 is a diagram schematically illustrating a connection form of the firefighting module 150 between two battery containers 100 in the battery system according to an aspect of the present disclosure.

Referring to FIGS. 22 to 24, the firefighting cabinet 300 can be configured to supply a fire extinguishing liquid to the battery container 100. Here, the fire extinguishing liquid can be water. In this sense, the firefighting cabinet 300 can be referred to as a Water Injection Unit (WIU) or a Water Injection System (WIS). In particular, the firefighting cabinet 300 can be provided outside of the battery container 100 and can include its own housing. In this instance, the housing of the firefighting cabinet 300 can be made of steel or can include steel. The firefighting cabinet 300 can be configured to hold the fire extinguishing liquid therein or receive the fire extinguishing liquid from an external source of supply. For example, the firefighting cabinet 300 can include a fire extinguishing liquid tank or can be connected to the firefighting fluid tank to receive the fire extinguishing liquid to be supplied to the battery container 100.

The battery container 100 can include the firefighting module 150 for receiving the supply of the fire extinguishing liquid (water) from the firefighting cabinet 300. First, the firefighting module 150 can be configured to supply the fire extinguishing liquid from the fire cabinet 300 to the battery rack 110 in the corresponding battery container 100. In particular, when a fire occurs in the battery container 100, the fire extinguishing module 150 can supply the fire extinguishing liquid, such as water, to prevent or suppress the fire.

Furthermore, the firefighting module 150 can include a firefighting connector 151, a firefighting pipe 152 and/or a spray nozzle 153.

The firefighting connector 151 can be exposed to the outer wall of the container housing 120, as indicated by A4 in FIGS. 22 and A5 in FIG. 23. The battery system according to the present disclosure can further include a supply pipe P1. The supply pipe P1 can be connected to the firefighting connector 151 of the battery container 100. Therefore, the fire extinguishing liquid supplied from the firefighting cabinet 300 can be fed into the container housing 120 via the firefighting connector 151 through the supply pipe P1. The firefighting connector 151 can be disposed below the container housing 120. In this case, it is possible to avoid or minimize interferences with the main connector 131 on the container housing 120.

At least a part of the firefighting pipe 152 can be provided in the internal space of the container housing 120, and one end can be connected to the firefighting connector 151. Then, the fire extinguishing liquid supplied from the firefighting cabinet 300 through the firefighting connector 151 can be transported to the specific space in the container housing 120. In particular, at least a part of the firefighting pipe 152 can be embedded in the beam of the container housing 120 or can be attached and fixed to the inner wall of the container housing 120.

The firefighting pipe 152 can include a main pipe 152M and a branch pipe 152B. The main pipe 152M can be, at one end, connected to the firefighting connector 151 to supply the fire extinguishing liquid from the firefighting cabinet 300 to the branch pipe 152B. Furthermore, the main pipe 152M can extend in the horizontal direction, for example, in the left-right direction along the lengthwise direction of the battery container 100.

The branch pipe 152B can branch off from one main pipe 152M into a plurality of pipes. In particular, the branch pipe 152B can be provided corresponding to each of a plurality of module stacks (formed by stacking a plurality of battery modules 111) arranged in the horizontal direction inside the battery container 100. In this instance, one or more module stacks can form the battery rack 110.

For example, when 10 module stacks are included in the container housing 120 in the horizontal direction, 10 branch pipes 152B can be included in the firefighting pipe 152. In addition, each of the branch pipes 152B can supply the fire extinguishing liquid to the battery module 111 included in each module stack. Furthermore, the branch pipe 152B can extend in the vertical direction corresponding to the stack configuration of the battery modules 111.

As shown in FIG. 22, the main pipe 152M can be provided on the bottom of the container housing 120, in particular, the bottom surface. Also, the branch pipe 152B can extend upward from the underlying main pipe 152M. In this case, the fire extinguishing liquid in each branch pipe 152B can be supplied upward from the bottom. According to the above-described exemplary configuration, it is possible to fully fill the internal space of the branch pipe 152B extending in the up-down direction with the fire extinguishing liquid without an empty space. Therefore, it is possible to sufficiently supply the fire extinguishing liquid to any of the battery modules 111 stacked in the up-down direction.

In particular, the main pipe 152M and/or the branch pipe 152B can be kept full of the fire extinguishing liquid even in a normal condition. In this case, it is possible to quickly supply the fire extinguishing liquid in the event of a fire.

The spray nozzle 153 can be disposed in the branch pipe 152B and configured to spray the fire extinguishing liquid to the battery module 111. The spray nozzle 153 can include a glass bulb or can be formed of a glass bulb. In this case, when a fire occurs, the glass bulb can be broken to eject the fire extinguishing liquid in the branch pipe 152B to the outside.

A plurality of spray nozzles 153 can be arranged along the vertical direction, which is the extension direction of the branch pipe 152B. Moreover, the injection nozzles 153 can be provided corresponding to each battery module 111 in a one-to-one relationship. In addition, the injection nozzle 153, in particular the glass bulb, can be configured to be inserted into the battery module 111.

Therefore, when a fire occurs in the specific battery module 111, the fire extinguishing liquid can be quickly supplied to the corresponding battery module 111. Moreover, in this case, the fire extinguishing liquid is not supplied to other normal battery modules 111, and the fire extinguishing liquid can be intensively injected into the battery module 111 having a problem. Therefore, it is possible to achieve the normal or emergency operation of the battery container 100 while minimizing damage to the normal battery module 111 included in the battery container 100.

Meanwhile, the firefighting cabinet 300 can be configured to recover the fire extinguishing liquid supplied in a normal or abnormal situation. In this instance, the battery system according to the present disclosure can include a return pipe as indicated by P1' in FIG. 22. For example, in the exemplary configuration of FIG. 22, the firefighting cabinet 300 can recover the fire extinguishing liquid from the battery container 100 through the return pipe P1'. To this end, the battery container 100 can include a firefighting connector 151 at a portion indicated by A4'. In this case, a portion indicated A4 can act as an inlet in the battery container 100, and the portion indicated by A4' can act as an outlet in the battery container 100.

In addition, the plurality of battery containers 100 can be configured to deliver the fire extinguishing liquid between them. For example, in the exemplary configuration of FIG. 2, three containers, i.e., the first container B-LINK #1, the second container B-LINK #2, and the third container B-LINK #3 can deliver the fire extinguishing liquid. More specifically, the firefighting cabinet 300 can supply the fire extinguishing liquid to the first container B-LINK #1. Then, the first container B-LINK #1 can use the fire extinguishing liquid supplied from the fire cabinet 300 to extinguish a fire, or deliver the fire extinguishing liquid to the second container B-LINK #2. In addition, the second container B-LINK #2 can use the fire extinguishing liquid delivered from the first container B-LINK #1 to suppress a fire or deliver it to the third container B-LINK #3. In particular, the plurality of battery containers 100 can be configured to sequentially deliver the fire extinguishing liquid to the adjacent containers.

In particular, the fire extinguishing module 150 provided in each battery container 100 can be configured to supply the fire extinguishing liquid supplied from the outside to the other battery container 100. For example, the battery container 100 can include the firefighting connector 151 on the left side as indicated by A4 in FIG. 22. In addition, the battery container 100 can also include the firefighting connector 151 on the right side as indicated by A5 in FIG. 23. That is, the battery container 100 can include the fire connectors 151 on at least different sides, for example, opposite sides. In addition, the main pipe 152M and/or the branch pipe 152B can be connected between the firefighting connectors 151 on different sides in one battery container 100.

In addition, the battery system according to the present disclosure can further include a connection pipe as indicated by P2 in FIG. 24. The connection pipe P2 can be connected between the firefighting connectors 151 provided in the two battery containers 100 to transfer the fire extinguishing liquid, such as water. In particular, the connection pipe P2 can be connected to the fire connector 151 of the two battery containers 100 facing each other. In order to improve the operation efficiency or assembly, the connection pipe P2 can be made of a flexible material or shape.

In a more specific example, the left container in FIG. 24 can be the first container B-LINK #1 and represent the right part of the container shown in FIG. 22. Also, the right part of the battery container 100 of FIG. 23 can be the configuration applied to the right part of the first container B-LINK #1 of FIG. 24. For example, the A5 portion provided with the firefighting connector 151 in FIG. 23 can be the configuration equally applied to the portion indicated by A5 in FIG. 24. Also, the right container of FIG. 24 is the second container B-LINK #2 and can have the same firefighting module 150 as the first container B-LINK #1 of FIG. 22. For example, in the second container B-LINK #2 of FIG. 24, the portion indicated by A6 can be provided with the firefighting connector 151 having the same or similar shape as the portion indicated by A4 in FIG. 22. As described above, the two battery containers 100 shown in FIG. 24 are containers included in the battery system according to an aspect of the present disclosure, and can have the same configuration, and there is no need to separately manufacture each battery container 100. Therefore, it is possible to efficiently build the battery system using the same type of battery container 100. In addition, it is possible to ensure the compatibility of the battery container 100 irrespective of the position.

In the exemplary configuration of FIG. 24, the second container B-LINK #2 can be supplied with the fire extinguishing liquid from the first container B-LINK #1 through the connection pipe P2. More specifically, the fire extinguishing liquid supplied from the fire cabinet 300 through the main pipe 152M of the first container B-LINK #1 can be delivered to the main pipe 152M of the second container B-LINK #2 via the connection the pipe P2 and the firefighting connector 151 of the second container B-LINK #2. The fire extinguishing liquid delivered to the main pipe 152M of the second container B-LINK #2 can supply the fire extinguishing liquid to the branch pipe 152B of the second container B-LINK #2. In addition, although not shown in the drawing, when other battery container 100, for example, the third container B-LINK #3 is disposed on the right side of the second container B-LINK #2, the fire extinguishing liquid can be delivered to the second container B-LINK #2 and the third container B-LINK #3 through the connection pipe P2 in the similar way to FIG. 24.

According to the above-described exemplary configuration of the present disclosure, in the battery system including the plurality of battery containers 100, it is possible to easily achieve the supply of the fire extinguishing liquid to each battery container 100. In particular, according to the above-described exemplary configuration, each battery container 100 does not need to have the configuration for storing and supplying a large amount of fire extinguishing liquid such as water. In addition, according to the above-described exemplary configuration, in order to receive the fire extinguishing liquid from the firefighting cabinet 300, it is not necessary to separately provide each supply pipe P1 from each battery container 100 to the firefighting cabinet 300. Accordingly, when constructing the battery system or the energy storage system, it is possible to form the structure of the firefighting equipment or perform the installation operation more simply. In particular, according to the above-described exemplary configuration, the supply pipe P1 can be connected to the battery container 100 closest to the firefighting cabinet 300, and the supply pipe P1 does not need to be directly connected to the firefighting cabinet 300 for each battery container 100. Therefore, it is possible to reduce the length of the supply pipe P1 for supplying the fire extinguishing liquid from the firefighting cabinet 300 to the battery container 100.

Therefore, according to the above-described exemplary configuration, it is possible to improve the fire safety of the battery system or the energy storage system including the same, and improve the convenience of installation or process efficiency for forming the structure with improved safety. In addition, in this case, it is possible to reduce the cost and time for preparing firefighting equipment. In addition, in the case of the above-described exemplary configuration, when the battery container 100 is added to the energy storage system, the firefighting module 150 built in the battery container 100 can be used. Accordingly, it is possible to provide the fire safety facilities quickly and conveniently when expanding the scale of the energy storage system.

Meanwhile, referring to the exemplary configuration of FIGS. 2 and 17, one firefighting cabinet 300 take responsibility of three battery containers 100, and is configured to directly or indirectly supply the fire extinguishing liquid to the corresponding battery containers. For example, in the exemplary configuration of FIG. 17, in the case of the first link group including the first to third containers B-LINK #1~3, one firefighting cabinet 300 (WIU1) can supply the fire extinguishing liquid to the first to third containers B-LINK #1~3. In addition, in the case of the second link group including the fourth to sixth containers B-LINK #4~6, the other one fire cabinet 300 (WIU2) can supply the fire extinguishing liquid to the fourth to sixth containers B-LINK #4~6. However, the present disclosure is not necessarily limited to the number of containers. For example, one firefighting cabinet 300 can be configured to supply the fire extinguishing liquid to four or more battery containers 100.

The firefighting cabinet 300 can include a control unit separately from the battery container 100 or the control cabinet 200. The control unit can be configured to detect an emergency situation such as a fire through its own sensor or a sensor provided in the battery container 100 and supply the fire extinguishing liquid. Alternatively, the control unit of the firefighting cabinet 300 can receive a control signal to supply the fire extinguishing liquid from the control module 210 of the control cabinet 200 or the BMS of the battery container 100, and supply the fire extinguishing liquid.

The firefighting cabinet 300 can communicate with the battery container 100 and/or the control cabinet 200 in order to perform the firefighting operation for ensuring the safety of the battery system. For example, the fire cabinet 300 can directly transmit and receive signals to/from the control cabinet 200 through a separate communication line. In addition, the fire cabinet 300 can transmit and receive signals to/from at least one battery container 100 through a separate communication line. In this instance, the fire cabinet 300 can communicate with one of the plurality of battery containers 100. Then, the battery container 100 having performed direct communication with the firefighting cabinet 300 can transmit a signal to other battery container 100. For example, in the exemplary configuration of FIG. 2, the firefighting cabinet 300 can directly transmit a signal only to the first container B-LINK #1. The signal transmitted from the firefighting cabinet 300 can be transmitted from the first container B-LINK #1 to the second container B-LINK #2. In addition, the second container B-LINK #2 receiving the signal can also transmit the corresponding signal to the third container B-LINK #3. In addition, when the signal is transmitted from the plurality of battery containers 100 to the firefighting cabinet 300, in the similar manner, the signal can be directly transmitted from only one battery container 100 to the firefighting cabinet 300. In addition, the signal of the remaining battery container 100 can be transmitted to the firefighting cabinet 300 via the battery container 100 connected to the firefighting cabinet 300.

According to the above-described exemplary configuration, it is possible to reduce the length or number of communication lines between the firefighting cabinet 300 and the plurality of battery containers 100. Accordingly, it is easy to construct the battery system or the energy storage system and it is possible to improve the convenience of installation.

In addition, as in the aspect of FIG. 17, when the plurality of control cabinets 200 are included in the battery system according to the present disclosure, some of the control cabinets 200 can act as the main control cabinet 200. For example, when the first control cabinet E-Link 1 and the second control cabinet E-Link 2 are included, the first control cabinet E-Link 1 can act as the main control cabinet 200. In this instance, the first control cabinet E-Link 1 can directly communicate with the PCS 400. Also, the second control cabinet E-Link 2 can indirectly communicate with the PCS 400 via communication with the first control cabinet E-Link 1.

Here, the first control cabinet E-Link 1 can transmit or receive control information or sensing information via communication with the battery container 100 (B-LINK #1, B-LINK #2, B-LINK #3) belonging to the first link group. In addition, the second control cabinet E-Link 2 can transmit or receive control information or sensing information via communication with the battery container 100 (B-LINK #4, B-LINK #5, B-LINK #6) belonging to the second link group.

In addition, although the aspect of FIG. 17 shows the two link groups, three or more link groups can be included in the battery system according to the present disclosure. Moreover, in the battery system according to the present disclosure, it is possible to add a new link group to the existing configuration. In addition, the battery system according to the present disclosure can be configured to easily add or remove the battery container 100 in one link group.

Meanwhile, in the battery system according to the present disclosure, each battery container 100 can include its own fire extinguishing system, apart from the firefighting module 150 previously described using FIGS. 22 to 24. For example, the battery container 100 can include a built-in fire extinguishing module configured to spray a fire extinguishing material such as Novec-1230 or aerosol after detecting an abnormal situation such as a fire through a temperature sensor or a smoke sensor. In this case, it is possible to appropriately respond to each type of fire, and improve the fire suppression performance through the injection of multiple fire extinguishing agents.

In addition, the battery system according to the present disclosure can further include a display module to display information about the condition of the battery container 100. The display module can be disposed on the side of the battery container 100, the control cabinet 200, or the firefighting cabinet 300. For example, the battery container 100 according to the present disclosure can include a warning sound generation device or a display device, as the display module to display a normal condition or an abnormal condition such as failure, overheat, fire, overcharge, overdischarge or the like.

The energy storage system according to the present disclosure includes the above-described battery system according to the present disclosure. In particular, the energy storage system according to the present disclosure can include a plurality of battery systems according to the present disclosure. In addition to the battery system according to the present disclosure, the energy storage system according to the present disclosure can employ various components of the energy storage system known at the time of filing the present application. For example, in addition to the battery system according to the present disclosure, the energy storage system according to the present disclosure can further include a power transmission line for transmitting power, a control device, or a power generation device such as a photovoltaic device.

As described above, although the present disclosure has been described with respect to the limited aspects and drawings, the present disclosure is not limited thereto, and it is obvious to those skilled in the art that various modifications and variations can be changed thereto within the technical aspect of the present disclosure and the scope of the appended claims and their equivalents.

DESCRIPTION OF REFERENCE NUMERALS

100: battery container
110: battery rack
111: battery module
120: container housing
130: first power line
130+: first positive line, 130−: first negative line
131: main connector
131+: positive connector, 131−: negative connector
MC1: first connector, MC2: second connector
132: main busbar
140: connector cover
141: upper cover, 142: side cover
150: firefighting module
151: firefighting connector
152: firefighting pipe
152M: main pipe, 152B: branch pipe
153: spray nozzle
160: air conditioning module
170: venting module
200: control cabinet
210: control module
220: cabinet housing
230: second power line
230+: second positive line, 230−: second negative line
300: firefighting cabinet
400: PCS
500: link busbar
600: link cover
610: mounting member, 620: cover member
710: link line
720: AC line
R, R1, R2, R3, R4: connector accommodating portion
F: coupling reinforcement portion
C: sealing member
SB: body portion. W: wing portion
TB: terminal busbar. TC: terminal cover
TC1: shroud panel. TC2: shroud cover
E: door
P1: supply pipe, P1': return pipe
P2: connection pipe

What is claimed is:

1. A battery system, comprising:
a plurality of battery containers, each battery container including a battery rack, a container housing accommodating the battery rack in an internal space, and a first power line configured to transmit charge power and discharge power, wherein the first power lines of the battery containers are connected to each other;
a control cabinet including:
a control module configured to control the plurality of battery containers;
a cabinet housing accommodating the control module in an internal space; and
a second power line configured to be connected to the first power line of a first battery container of the plurality of battery containers,
wherein the control cabinet is spaced from the plurality of battery containers; and
a third power line extending from the first power line of the first battery container to the first power line of a second battery container of the plurality of battery containers,
wherein each of the plurality of battery containers has a recess in a side of the container housing,
wherein an end of the first power line extends into the recess,
wherein each of the plurality of battery containers has a cover covering the recess, the cover hingedly connected to the container housing,
wherein the cover of one of a pair of battery containers of the plurality of battery containers is hingedly connected along a top edge of the cover,
wherein the cover has a first position covering the recess and a second position with a bottom edge of the cover contacting an other of the pair of battery containers,
wherein a wing portion is attached to each side edge of the cover,
wherein the cover has a first mounting member, a second mounting member and a cover member extending between the first mounting member and the second mounting member, the cover member forming an enclosure,
wherein each of the plurality of battery containers has a main pipe,
wherein a firefighting cabinet configured to supply a fire extinguishing liquid to one of the plurality of battery containers is connected to the main pipe of the first battery container, and
wherein the main pipe of the first battery container is connected to the main pipe of a second battery container.

2. The battery system according to claim 1, wherein the first power line, the second power line and the third power line are configured to transmit DC power.

3. The battery system according to claim 2, further comprising:
a power convertor connected to the second power line of the control cabinet and configured to perform AC-DC conversion of the charge power and discharge power for the plurality of battery containers.

4. The battery system according to claim 1, wherein each of the plurality of battery containers is configured to deliver the power of the plurality of battery containers.

5. The battery system according to claim 1, wherein the first power line includes a plurality of main connectors, and a main busbar configured to continuously extend between the plurality of main connectors.

6. The battery system according to claim 5, wherein the plurality of battery containers are spaced a predetermined distance apart from each other in a horizontal direction, and
wherein the third power line comprises a link busbar connecting the main connectors of adjacent battery containers of the plurality of battery containers.

7. The battery system according to claim 5, wherein the plurality of main connectors are disposed on an upper side of the container housing.

8. The battery system according to claim 1, wherein a plurality of battery racks are included in the container housing, and connected in parallel to the first power line.

9. The battery system according to claim 1, wherein the control cabinet is connected to each of the plurality of battery containers via an AC power line.

10. The battery system according to claim 1, wherein two or more control cabinets are included and connected to a power convertor, and the plurality of battery containers are connected to each control cabinet.

11. The battery system according to claim 1, wherein the plurality of battery containers are configured to deliver the fire extinguishing liquid between one another.

12. An energy storage system comprising
at least one battery system, the at least one battery system comprising:
a plurality of battery containers, each battery container including a battery rack, a container housing accommodating the battery rack in an internal space, and a first power line configured to transmit charge power and discharge power, wherein the first power lines of the battery containers are connected to each other;
a control cabinet including:
a control module configured to control the plurality of battery containers;
a cabinet housing accommodating the control module in an internal space; and
a second power line configured to be connected to the first power line of a first battery container of the plurality of battery containers,
wherein the control cabinet is spaced from the plurality of battery containers; and
a third power line extending from the first power line of the first battery container to the first power line of a second battery container of the plurality of battery containers,
wherein each of the plurality of battery containers has a recess in a side of the container housing,
wherein an end of the first power line extends into the recess,
wherein each of the plurality of battery containers has a cover covering the recess, the cover hingedly connected to the container housing,
wherein the cover of one of a pair of battery containers of the plurality of battery containers is hingedly connected along a top edge of the cover,
wherein the cover has a first position covering the recess and a second position with a bottom edge of the cover contacting an other of the pair of battery containers,
wherein a wing portion is attached to each side edge of the cover,
wherein the cover has a first mounting member, a second mounting member and a cover member extending between the first mounting member and the second mounting member, the cover member forming an enclosure,
wherein each of the plurality of battery containers has a main pipe,
wherein a firefighting cabinet configured to supply a fire extinguishing liquid to one of the plurality of battery containers is connected to the main pipe of the first battery container, and
wherein the main pipe of the first battery container is connected to the main pipe of a second battery container.

13. The energy storage system according to claim 12, wherein the first power line, the second power line and the third power line are configured to transmit DC power.

14. The energy storage system according to claim 13, further comprising a power convertor connected to the second power line of the control cabinet and configured to perform AC-DC conversion of the charge power and discharge power for the plurality of battery containers.

15. The energy storage system according to claim 12, wherein each of the plurality of battery containers is configured to deliver the power of the plurality of battery containers.

16. The energy storage system according to claim 12, wherein the first power line includes a plurality of main connectors, and a main busbar configured to continuously extend between the plurality of main connectors.

17. The energy storage system according to claim 16, wherein the plurality of battery containers are spaced a predetermined distance apart from each other in a horizontal direction, and
wherein the third power line comprises a link busbar connecting the main connectors of adjacent battery containers of the plurality of battery containers.

18. The energy storage system according to claim 16, wherein the plurality of main connectors are disposed on an upper side of the container housing.

19. The energy storage system according to claim 12, wherein a plurality of battery racks are included in the container housing, and connected in parallel to the first power line.

* * * * *